(12) United States Patent
Divakaran et al.

(10) Patent No.: US 11,494,519 B2
(45) Date of Patent: *Nov. 8, 2022

(54) HARDWARE-ASSISTED PRIVACY PROTECTION USING A SECURE USER INTERFACE WITH MULTI-LEVEL ACCESS CONTROL OF SENSOR DATA

(71) Applicant: Intel Corporation, Santa Clara, CA (US)

(72) Inventors: Sudeep Divakaran, Bangalore (IN); Ranjit Sivaram Narjala, Bangalore (IN); Prashant Dewan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/379,470

(22) Filed: Jul. 19, 2021

(65) Prior Publication Data

US 2022/0083678 A1  Mar. 17, 2022

Related U.S. Application Data

(63) Continuation of application No. 16/457,904, filed on Jun. 28, 2019, now Pat. No. 11,093,648.

(51) Int. Cl.
*G06F 21/62* (2013.01)
*G06F 9/451* (2018.01)
(Continued)

(52) U.S. Cl.
CPC .......... *G06F 21/629* (2013.01); *G06F 3/0362* (2013.01); *G06F 3/0482* (2013.01);
(Continued)

(58) Field of Classification Search
CPC .... G06F 21/629; G06F 21/6218; G06F 21/32; G06F 9/451; G06F 3/0362; G06F 3/0482; G06F 3/04847; G06F 3/04886
See application file for complete search history.

(56) References Cited

U.S. PATENT DOCUMENTS

| | | |
|---|---|---|
| 2004/0039492 A1 | 2/2004 | Demontis et al. |
| 2015/0213252 A1 | 7/2015 | Wilairat |
| 2016/0187961 A1 | 6/2016 | Elibol et al. |
| 2018/0285568 A1 | 10/2018 | Finger |

OTHER PUBLICATIONS

Apple Inc., "iOS Security, iOS 10," Mar. 2017, available online at https://www.apple.com/kr/business-docs/iOS_Security_Guide.pdf (68 pages).

(Continued)

*Primary Examiner* — Seth A Silverman
(74) *Attorney, Agent, or Firm* — Alliance IP, LLC

(57) ABSTRACT

Technologies provide hardware-assisted privacy protection of sensor data. One embodiment includes unlocking a user interface coupled to a trusted execution environment of a processor in a device, where the user interface includes a plurality of selectable settings associated with a plurality of access levels for sensor data captured by a sensor. The embodiment also includes receiving a selection signal from the user interface indicating that a user selected a first setting associated with a first access level for the sensor data captured by the sensor, and restricting access to the sensor data based on a first set of one or more entities associated with the first access level. In more specific embodiments, the user interface includes a knob that is rotatably attached to a housing of the device or a privacy panel including a slider bar that is to be displayed on a touch screen display of the device.

24 Claims, 13 Drawing Sheets

(51) Int. Cl.
G06F 3/04886 (2022.01)
G06F 3/04847 (2022.01)
G06F 3/0362 (2013.01)
G06F 3/0482 (2013.01)
G06F 21/32 (2013.01)

(52) U.S. Cl.
CPC ...... *G06F 3/04847* (2013.01); *G06F 3/04886* (2013.01); *G06F 9/451* (2018.02); *G06F 21/32* (2013.01); *G06F 21/6218* (2013.01)

(56) References Cited

OTHER PUBLICATIONS

Buhr, Sarah, "The Apple Watch can accurately detect hypertension and sleep apnea, a new study suggests," TechCrunch, Nov. 13, 2017, available online at https://techcrunch.com/2017/11/13/the-apple-watch-can-accurately-detect-detect-hypertension-and-sleep-apnea-a-new-study-suggests/ (12 pages).

White, Tracie, "Stanford, Apple describe heart study with over 400,000 participants," Stanford Medicine News Center, Nov. 1, 2018, available online at https://med.stanford.edu/news/all-news/2018/11/stanford-apple-describe-heart-study-with-over-400000-participants.html (5 pages).

Fitzsimmons, Michelle, "Amazon Echo Spot Release Data, Price and Features," TechRadar.com, Sep. 28, 2017, available online at https://www.techradar.com/news/amazon-echo-spot-release-date-price-and-feature (12 pages).

McCue, T.J., "Alexa is Listening All the Time: Here's How to Top It," Forbes Consumer Tech, Apr. 19, 2019, available online at https://www.forbes.com/sites/tjmccue/2019/04/19/alexa-is-listening-all-the-time-heres-how-to-stop-it/#4d6a45875e2d (6 pages).

O'Flaherty, Kate, "Amazon Staff Are Listening to Alexa Conversations—Here's What to Do," Forbes, Apr. 12, 2019, available online at https://www.forbes.com/sites/kateoflahertyuk/2019/04/12/amazon-staff-are-listening-to-alexa-conversations-heres-what-to-do/#2710149471a2 (4 pages).

HARDWARE-ASSISTED PRIVACY PROTECTION USING A SECURE USER INTERFACE WITH MULTI-LEVEL ACCESS CONTROL OF SENSOR DATA

CROSS-REFERENCE TO RELATED APPLICATIONS

This application is a continuation of (and under 35 U.S.C. § 120 claims the benefit of and priority to) U.S. application Ser. No. 16/457,904, filed Jun. 28, 2019, and entitled "HARDWARE-ASSISTED PRIVACY PROTECTION USING A SECURE USER INTERFACE WITH MULTI-LEVEL ACCESS CONTROL OF SENSOR DATA". The disclosure of the prior application is considered part of and is incorporated by reference in the disclosure of this application.

TECHNICAL FIELD

This disclosure relates in general to the field of data security, and more particularly to hardware-assisted privacy protection using a secure user interface with multi-level access control of sensor data.

BACKGROUND

Always-on features on user devices are enabling a wave of innovation to enrich experiences for consumers. Always-on devices can sense the environment continuously to gather data that can be analyzed and consumed to provide useful services. Sensors that can collect data continuously include but are not limited to cameras and audio microphones. While these always-on sensors and a myriad of other always-on sensors offer tremendous potential for services and features, they can impose a privacy risk depending on which systems have access to the collected data. Users could benefit from mechanisms to help control, manage, and restrict the usage of collected sensor data within a device and external to the device.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EMBODIMENTS

Figure 1:
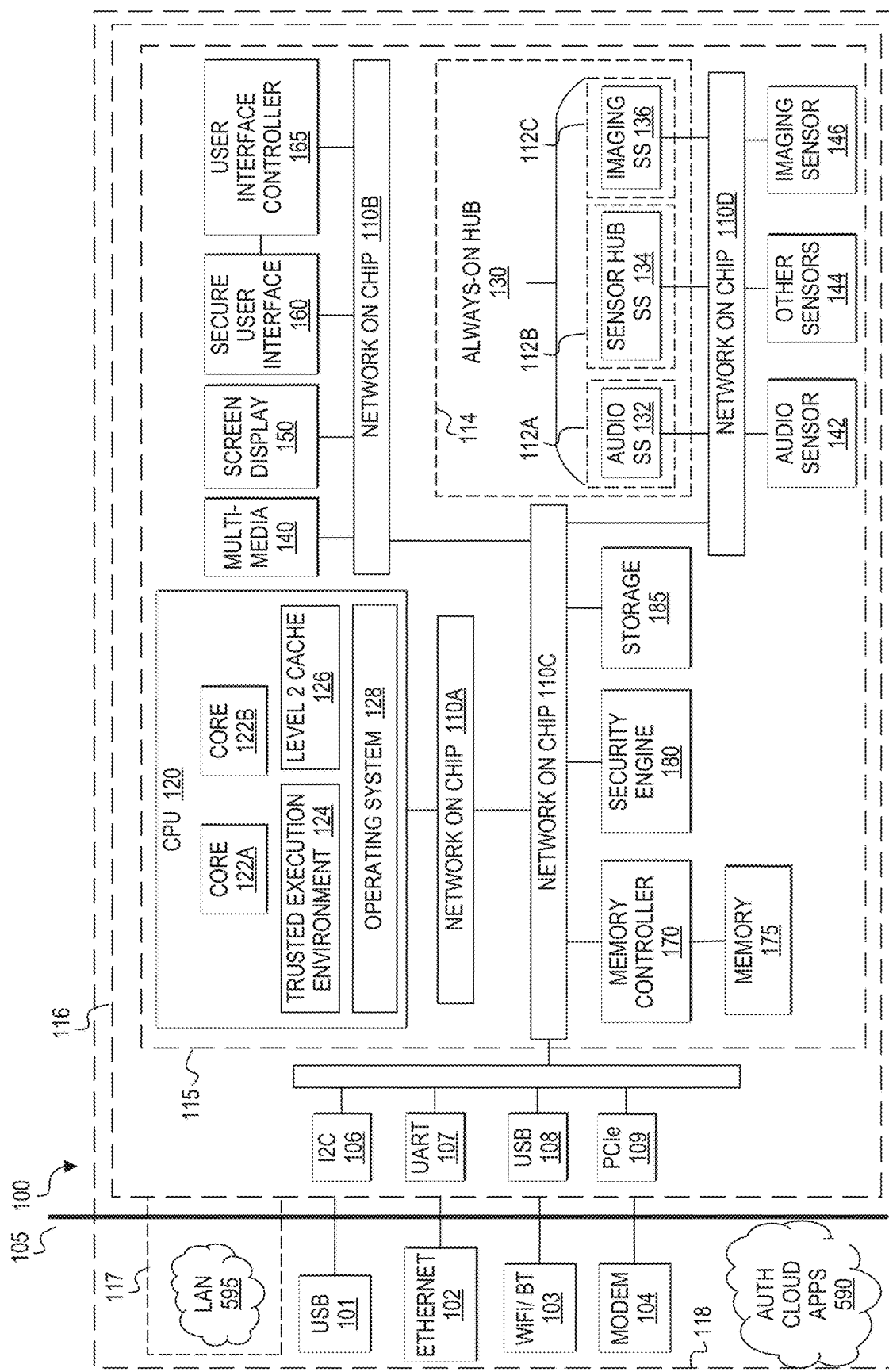
FIG. 1 is a simplified block diagram of a possible architecture of a device including hardware-assisted privacy protection with a secure user interface for multi-level access control of sensor data according to at least one embodiment.

The following disclosure provides various possible embodiments, or examples, in the form of methods, systems, apparatuses, and computer-readable storage media for implementing hardware-assisted privacy protection using a secure user interface with multi-level access control of sensor data. Embodiments herein include a secure user interface (e.g., secure touch screen, secure physical switch or knob, other input interface with secure access) that can manage gating control or access levels that specify which hardware, software, firmware, services, or any combination thereof can have access to the data captured by a sensor on the device. The user interface can be protected using any type of security (e.g., fingerprint, password, etc.) so that an access level can be set only by an authorized user. The secure user interface can use a hardware-assisted trusted execution environment (TEE) based support to control how the data captured from one or more sensors can be limited to internal and external systems as desired by the user.

For purposes of illustrating the several embodiments of hardware-assisted privacy protection for sensor data using a secure user interface with multi-level access control, it is important to first understand data privacy concerns and data flows from a user device, such as a system on chip (SoC). Accordingly, the following foundational information may be viewed as a basis from which the present disclosure may be properly explained.

Many computing systems built today include "always-on" sensors and this trend is not diminishing. As used herein, the term "always-on sensor" is intended to mean a sensor in a computing system or device that performs a sensing function and gathers data regardless of the state of the computing system or device. For example, an "always-on audio sensor" in a personal assistant device may capture audio signals when the personal assistant device is powered on, powered off, or in a sleep mode. Thus, an always-on audio sensor is always listening.

Although always-on sensors can provide tremendous benefits from information that is continuously collected from an environment, such capabilities can create a privacy risk for individuals within that environment. Typically, systems with always-on sensors address this privacy risk by providing an option to disable the sensors. With this solution, although privacy is assured only by disabling the sensor, such actions can have a significant downside. Specifically, if a sensor is disabled, the user will not benefit from any data analytics based features that would otherwise be possible using the sensor data.

The disable/enable feature also lacks flexibility of allowing a user to dynamically select who or which systems can be given access to the user data. If the sensor is enabled and the user wants the sensor data to be used at various access levels (e.g., sensors, high level operating system applications, connected devices, local area network, or cloud services), there is no mechanism to make this possible. Generally, there is currently no user interface and hardware system support to help users control, manage, and restrict the usage of sensor data within a device and external to a device. In some scenarios, a user may want to restrict how their personal content is used or accessed, while in other scenarios, the user may be willing to share the data with a wider audience for greater benefits. Today there is no secure user interface or underlying hardware support to guarantee such multi-level private data access control.

A device 100 with a hardware-assisted privacy protection system, as shown in FIG. 1, resolves many of the aforementioned issues (and more). Embodiments described herein give users flexibility to choose which internal and external entities of a device can be given access to sensor data. The system includes a secure user interface (e.g., a secure touch screen, secure physical switch or knob, or some other input interface with secure access) for a user to control a privacy setting for sensor data. The secure user interface can be used to manage gating access levels, where the access levels specify what internal or external entities (e.g., components, systems, sub-systems, networks, connected devices, cloud services, etc.) can have access to data captured by a sensor on the device. The user interface is protected using some secure mechanism (e.g. fingerprint based control, password, etc.) so that a privacy setting associated with a particular access level can be selected only by an authorized user. Access is defined in a hierarchical arrangement with the lowest access level (i.e., most restrictive) including only the sensor subsystem firmware, the next higher access level including firmware of multiple sensor subsystems, the next higher access level including device applications, the next higher access level including a connected device, the next higher access level including devices within a home or local area network, and the highest access level (i.e., least restrictive) including authorized external systems such as certified cloud servers or authorized cloud applications. Access granted based on a selected privacy setting can include access that is allowed for all of the privacy settings that are more restrictive than the selected privacy setting. Hardware-assisted privacy protection, such as a Trusted Execution Environment (TEE), can be used to control how the data captured from one or more sensors can be restricted to internal and external entities as desired by the user.

Embodiments described herein allow users to protect the privacy of data collected from always-on sensors in a flexible and secure manner. Embodiments with hardware-assisted privacy protection of sensor data enable privacy protection in-built from the source of data. This enables a user to limit data usage dynamically at various access levels from sensors all the way to the cloud. Both access rights and time of usage can be managed. One or more embodiments provide a secure user interface (e.g., secure touch, physical knob, etc.) for the user to select a privacy setting corresponding to a desired access level. Thus, only authorized users or entities (e.g., components, systems, sub-systems, services, firmware, applications, etc.) can access the data and the integrity of the data can be maintained. Additionally, with embodiments described herein, a user is not forced to forgo all services and features when privacy is desired for certain sensor data. Instead, one or more embodiments provide the user with flexibility of multi-level data access control. Thus, a user may allow some limited access to the sensor data for the desired purposes (e.g., use by a high level operating system application) without having to completely disable the sensing devices to prevent unfettered access to the sensor data (e.g., by external devices such as cloud servers).

Turning to FIG. 1, FIG. 1 is a block diagram of device 100 with always-on sensing capabilities. In at least one example, device 100 may embody a system on chip (SoC) architecture. Device 100 is configured with a hardware-assisted privacy protection system using a secure user interface with multi-level access control of sensor data. The architecture includes a central processing unit (CPU) 120 with cores 122A-122B, a trusted execution environment (TEE) 124, a level 2 cache 126, and an operating system 128 (e.g., high level operating system (HLOS)). In addition to a CPU, the SoC architecture may include a multi-media component 140 (e.g., graphics processing unit, etc.), a screen display 150, a secure user interface 160, a user interface controller 165, a memory controller 170, memory 175, a security engine 180, storage 185, and an always-on hub 130, which are interconnected via a networks on chip 110A, 110B, 110C, and 110D. Network on chip 110C also connects communication interfaces and devices such as I squared C (I2C) interface 106, a universal asynchronous receiver/transmitter (UART) 107, a universal serial bus (USB) port 107, and a peripheral component interconnect express root complex 109. Various communication interfaces and devices may connect to the SoC to enable communication from external entities to the SoC. In at least some scenarios, communication from external systems and devices may be achieved via one or more networks 105. For example, the SoC may connect to other devices in a local or home network 595, for example, via ethernet 102 and/or a WiFi/BT device 103. WiFi/BT device 103 may provide WiFi access globally to external devices (e.g., router, modem), and a modem 104 may provide fast connection to external systems, including authorized cloud applications 590, for access to data analytics and features offered by such systems, for example.

Device 100 may connect to multiple discrete, network environments. Generally, device 100 can be connected to any type or topology of networks, indicated by network 105. Network 105 represents a series of points or nodes of interconnected communication paths for receiving and sending network communications that propagate through the network. Network 105 offers a communicative interface between nodes, and may be configured as any local area network (LAN) (e.g., 595), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment, or any suitable combination thereof. Network 105 can use any suitable technologies for communication including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., Ethernet, etc.) communication. Generally, any suitable means of communication may be used such as electric, sound, light, infrared, and/or radio (e.g., WiFi, Bluetooth or NFC).

Always-on hub 130 can include multiple sensor subsystems that receive sensor data collected by various sensing capabilities of the SoC. For example, audio subsystem 132 may receive audio data from an audio sensor, and imaging subsystem 136 may receive imaging data (or pictures) from an imaging sensor (or camera). A sensor hub subsystem 134 may receive sensor data from multiple sensors, such as sensors that track location and movement/orientation of the phone. In one example, sensor hub subsystem 134 may receive sensor data collected by a gyroscope, an accelerometer, and/or a global positioning system (GPS). The sensor subsystems can be connected to the CPU, memory, and other components of device 100 via a network on chip.

An always-on system with sensing capabilities can be architected as multiple secure separated on chip domains 112A, 112B, 112C, 114, and 115. In addition, external entities connected to an always-on system can also be architected as multiple secure domains 116, 117, and 118. Each domain can define a region of the architecture or external entities with a respective data boundary gating. The gating restrictions applied to sensor data and post-processed data can be based on different sensor data access levels that are dynamically adjustable by a user. As privacy is increased, the domain is narrowed, and feature capabilities can decrease. Conversely, as privacy is decreased, the domain is broadened, and feature capabilities can increase. Trade-offs with respect to feature capabilities at each sensor data access level is shown in the table below:

As shown in the above table, one or more embodiments can restrict sensor data and/or post processed data (e.g., data processed from sensor data) to entities within a domain corresponding to a sensor data access level, which may be applied to sensor data according to a privacy setting selected by the user. Sensor data can cross the data boundary based on the user privacy setting. It should be noted that references herein to 'sensor data' are intended to include any sensor data collected from a sensing device and any post-processed sensor data, which can include data that is derived from the collected sensor data. Also, as used herein, 'entities' are intended to include internal and external entities relative to a device, such as device 100, which is configured with hardware-assisted privacy protection using a secure user interface as described herein. For example, 'internal entities' are intended to include, but are not necessarily limited to components, systems, sub-systems, applications, high-level operating system (HLOS) applications, sensor firmware, and/or inter-sensor subsystems of a device, such as device 100. In further examples, 'external entities' are intended to include, but are not necessarily limited to locally or remotely connected devices, networks, cloud services, cloud servers, and/or applications (e.g., in a cloud, in a network, in a connected devices, etc.) communicably connected to or otherwise associated with a device, such as device 100.

With reference to FIG. 1, the example domains and sensor data access levels shown in the above table will now be described. Selection of a privacy setting corresponding to level 0 enforces data boundaries of sensors marked into specific regions including, for example, sensor domain 112A for audio subsystem 132, sensor domain 112B for sensor hub subsystem 134, and sensor domain 112C for imaging subsystem 136. At level 0, data is restricted to the firmware and devices within each of the sensor domains 112A, 112B, and 112C, without being shared across sensor domains. At level 0, sensor data cannot be shared outside each sensor subsystem.

| SETTING | SENSOR DATA ACCESS LEVEL | FEATURE CAPABILITIES |
|---|---|---|
| LEVEL 0 | Restricted to within sensing devices (the basic minimum feature level) & sensor firmware | Sensor data processing only with sensor firmware. Lowest feature level |
| LEVEL 1 | Restricted to within the Inter-Sensors domain inside the SoC | Sensor Data shared between firmware sub-systems, but not shared to Host Applications. Some higher level analytics is possible (e.g. correlating with other sensor data or analytics using Gen GPU or Neural Network engines such as Intel ® Movidius ™ vision processing unit, etc.) |
| LEVEL 2 | Restricted to High Level OS Applications that use processing and secure storage using TEE support | Sensor Data shared with High level OS for extended use by TEE enabled applications with better user-interfaces and data analysis/visualization |
| LEVEL 3 | Restricted to connected client device (e.g. PC) via various connectivity interfaces (USB, Wireless, etc.) | Sensor Data or post-processed data shared with an external computer for enhanced processing/data analytics |
| LEVEL 4 | Restricted to authorized devices within the home or Internet Protocol local network | Sensor Data or post-processed data shared within Home or Internal LAN network for other devices to use the data and provide enhanced services |
| LEVEL 5 | Restricted to certified Servers (e.g., authenticated cloud services) | Sensor data shared with Cloud Applications for more services or deeper analytics/processing. Highest Feature Level |
| LEVEL 6 | Unrestricted access to sensor data | Sensor data can be shared with any internal entities and any external entities, subject to other controls that may be implemented |

A privacy setting corresponding to level 1 enforces a data boundary defined by inter-sensor domain 114 that includes all of the sensor subsystems (e.g., 132, 134, 136) in the SoC. At level 1, sensor data can be shared among firmware of the sensor subsystems but may not be shared outside the inter-sensor domain 114 to host applications, connected devices, local area networks, or cloud servers. Some higher level analytics may be possible within the inter-sensor domain such as, for example, correlating with other sensor data or analytics using, for example, an $n^{th}$ generation graphics processing unit (Gen GPU) or neural network engines (e.g., vision processing unit (VPU), etc.).

A privacy setting corresponding to level 2 enforces a data boundary defined by device applications domain 115 that includes applications of an operating system (e.g., an HLOS) and the lower level domains 114 and 112A-112C. Sensor data within device applications domain 115 may be restricted to HLOS applications that use secure processing and secure storage supported by a trusted execution environment TEE (e.g., TEE 124) and to the components within the lower level domains 114 and 112A-112C. TEE-enabled applications can offer more sophisticated user interfaces for sensor data, along with more advanced data analysis and visualization of sensor data than what can be provided in the lower level domains.

A privacy setting corresponding to level 3 enforces a data boundary defined by connected device domain 116, which includes a connected client device and the lower level domains 115, 114, and 112A-C. Level 3 restricts sensor data to the connected client device, which may be a personal computer connected to the SoC via an approved connectivity interface (e.g., USB, wireless, bluetooth, etc.). Sensor data may also be processed by the lower level domains. Sensor data or post-processed data may be shared with an external connected device to obtain enhanced processing and data analytics.

A privacy setting corresponding to level 4 enforces a data boundary defined by connected local area network domain 117 such as an Internet protocol (IP) LAN or a home network, which may be implemented as an IP LAN in at least some implementations. In one example, the local area network may be connected to the SoC via ethernet 102 and/or WiFi/BT device 103. The local area network domain also includes all of the lower level domains 116, 115, 114, and 112A-C. Sensor data or post-processed data shared within a home or internal LAN hosting multiple other devices can enable sensor data to be used for enhanced data analytics and/or services.

A privacy setting corresponding to level 5 enforces a data boundary that is defined by cloud domain 118 and all lower level domains. In at least one embodiment, the cloud domain may include certified servers and/or authorized cloud applications. In one example, the cloud servers and applications may be connected to the SoC via ethernet 102, WiFi device 103, modem 104, any other suitable communication technology, or any suitable combination thereof. Sensor data and post-processed data may be shared with cloud applications for additional services and/or deeper analytics and processing.

In at least some embodiments, a privacy setting corresponding to a level 6 may be provided in which no access restrictions are enforced internally or externally. Therefore, sensor data can be accessed from any internal or external entity. For example, external entities that include uncertified services and/or non-authorized cloud applications are not restricted from accessing the sensor data. In addition, this unrestricted domain also includes all of the lower level domains 118, 116, 115, 114, and 112A-C as components in each of these domains can access sensor data.

In some embodiments, the same access level corresponding to a selected privacy setting is applied to all sensors. Thus, if a privacy setting corresponding to level 2 is selected, then data from all of the sensors (e.g., audio sensor, imaging sensor, sensors that feed data to sensor hub) may be used by HLOS applications but may not be shared outside the device. In other embodiments, access levels can be more granular, and an access level may be selected for each sensor or some combination of sensors. For example, in this embodiment, a privacy setting corresponding to level 2 may be selected for audio sensor data and imaging sensor data, while another privacy setting corresponding to level 5 may be selected for data gathered by sensors associated with the sensor hub. Thus, location information may be shared with cloud applications, but a stronger privacy setting may be applied to audio and imaging data to prevent such data from being shared outside the device.

One or more embodiments incorporate a gating functionality of sensor data (or data derived from sensor data) at each domain boundary using a centralized TEE system, such as TEE 124 of CPU 120. The TEE is a secure area of a processor that can protect confidentiality and integrity of data and code loaded inside protected memory. TEE 124 may be configured to manage key assignment to each of the multiple secure domains for data encryption and decryption and memory integrity functions. Any suitable trusted execution environment or other confidentiality and integrity mechanism may be used to enforce gating functionality of the data at each domain boundary to control data access internally and externally in a multi-level access approach including, but not necessarily limited to Intel Software Guard Extensions (SGX), ARM TrustZone, Intel On-Chip System Fabric (IOSF), digital rights management (DRM), virtual machine manager (VMM) implementing a TEE, secure keys, encryption/decryption, Security Attribute of Initiator (SAI), etc. Generally, any suitable mechanism having a root of trust to manage the interfaces among the various domains may be used. The interfaces are connected to the TEE rather than the components within the different domains.

At the user level, control of privacy settings may be provided via secure user interface 160. The secure user interface can provide a user with a secure way to configure the access level to control which subsystems within the device (e.g., sensors subsystem, firmware blocks, embedded high level operating system host applications, etc.) and/or external entities (e.g., within the home or outside in the cloud) are allowed to have access to the sensor data captured by the sensors of the device. Any suitable secure mechanism may be implemented to ensure that only an authorized user is permitted to adjust the access level applied to the sensor data. Examples of a secure mechanism that can be implemented include, but are not necessarily limited to, a fingerprint sensor, a password, a unique passcode sent via a messaging service to a mobile device, a two-part authentication (e.g., passwords and passcode), any biometric authentication mechanism (e.g., facial recognition, voice recognition, fingerprint, etc.), etc.

Any number of different systems could use the features described in embodiments of device 100. For example, connected home devices (e.g., Amazon echo, Google Home, etc.), mobile devices (e.g., smart phones, tablets, etc.), laptops, personal computers, or any other device in which always-on sensors are implemented to continuously collect data may be implemented with the features described in embodiments of device 100.

Figure 2:
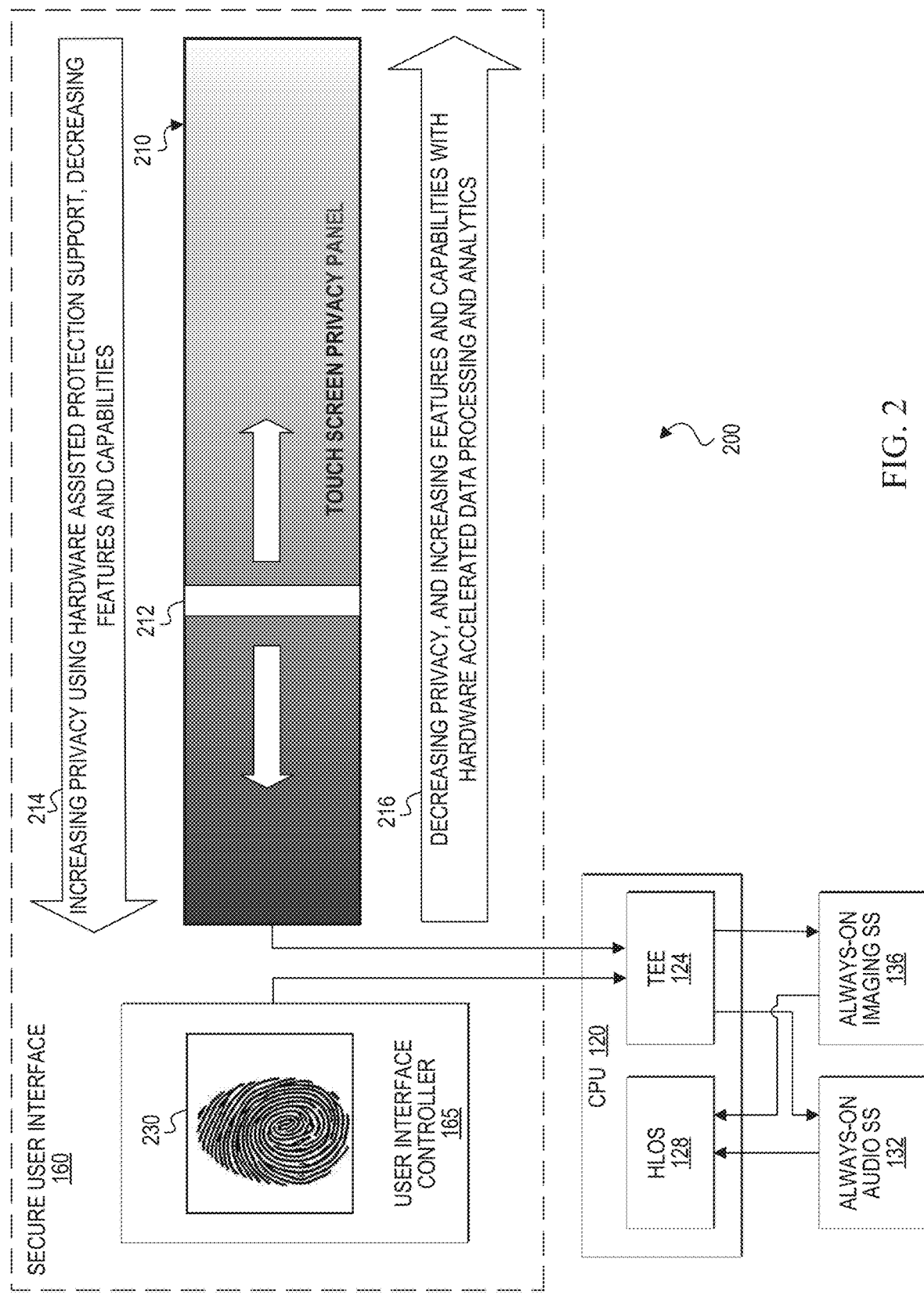
FIG. 2 is a simplified illustration of an embodiment of a secure user interface for hardware-assisted privacy protection of sensor data according to at least one embodiment.

Turning to FIG. 2, FIG. 2 is a simplified illustration of one example implementation 200 of hardware-assisted privacy protection for dynamically changing an access level for sensor data and post processed data in an always-on device, such as device 100. In FIG. 2, certain components of device 100 are shown to illustrate the example implementation of hardware-assisted privacy protection. In particular, the components shown in FIG. 2 include CPU 120 with high level operating system (HLOS) 128 and trusted execution environment (TEE) 124, always-on audio subsystem 132, always-on imaging subsystem 136, secure user interface 160, and user interface controller 165.

Secure user interface 160 includes user interface controller 165 and a privacy setting mechanism. In the example of FIG. 2, the privacy setting mechanism is a secure touch screen privacy panel 210 with a slider bar 212. Slider bar 212 may be movable within touch screen privacy panel 210 by a finger or stylus touching the slider bar and applying appropriate pressure to move the input bar in a lateral direction (e.g., left or right) among a plurality of selectable privacy settings at a plurality of different areas or positions within the secure touch screen privacy panel 210. In one example, as the slider bar 212 moves to the left, the selectable privacy settings may correspond to lower access levels that can be applied to increase privacy restrictions on sensor data. As the slider bar 212 moves to the right, the selectable privacy settings may correspond to higher access levels that can be applied to decrease the privacy restrictions on sensor data.

There may be a trade-off between the privacy restrictions versus feature capabilities possible at each access level. As indicated at 214, increasing the privacy restrictions by moving slider bar 212 to the left may result in decreasing features and capabilities for the sensor data. As indicated at 216, decreasing privacy restrictions by moving slider bar 212 to the right may result in increasing features and capabilities with hardware accelerated data processing and analytics for the sensor data. For example, a privacy setting corresponding to the lowest access level (Level 0) may be selected when the slider bar is moved as far left as possible within touch screen privacy panel 210. When a privacy setting corresponding to access level 0 is selected, the access to sensor data is the most restrictive. In this scenario, sensor data remains within the sensor subsystem domain, where very limited data processing is possible. As the slider bar 212 is moved to privacy settings corresponding to higher access levels (e.g., Levels 1-6), incrementally fewer privacy restrictions on data access are enforced, and more functionalities can be enabled. As privacy restrictions decrease at each higher access level, the domains within which the sensor data may be shared widen. Accordingly, greater processing power and analytics engines may be available at those higher access levels for the sensor data.

Touch screen privacy panel 210 may be secured, at least in part, by the user interface controller to ensure that only an authorized user is permitted to change the privacy settings of sensor data generated by device 100. In the example implementation 200 of FIG. 2, user interface controller 165 may include a fingerprint sensor for detecting and recognizing a fingerprint 230 of the user. In at least one embodiment, one or more prompts may be provided on the screen display to notify the user that authentication is required in order to unlock the touch screen privacy panel. The fingerprint may be provided to device 100 using any suitable fingerprint receiving device, such as a fingerprint-sensitive button or a designated area on the touch screen, for example. Authentication input information (e.g., fingerprint 230) may be provided to TEE 124 via an interface of the user interface controller and processed by TEE 124 in a secure environment. If the authentication passes, then TEE 124 can cause secure touch screen privacy panel 210 to be unlocked with the various privacy settings being selectable by the user. If the authentication fails, then TEE 124 does not unlock secure touch screen privacy panel 210 and privacy settings of sensor data (e.g., from audio subsystem 132 and imaging subsystem 136) are not selectable by the user.

In at least one embodiment, TEE 124 may manage the locking and unlocking of the touch screen privacy panel. In one example, the signal that is sent to the TEE 124 in response to a user's selection of a privacy setting may be intercepted by the TEE 124. TEE 124 may determine whether a successful authentication of the user has not expired. If the user has already been successfully authenticated and the authentication has not expired, then the TEE 124 may process the selection signal from the touch screen privacy panel and change the access level to the sensor data based on the newly selected privacy setting. If the user has not been successfully authenticated or if a prior successful authentication has expired, then the TEE 124 may block the selection signal and not allow the access level to the sensor data to be changed.

TEE 124 is also connected to an interface of secure touch screen privacy panel 210 to receive indications of a selected privacy setting. When TEE 124 receives an indication that a privacy setting has been selected, the TEE 124 enforces data boundary gating according to an appropriate one of two or more predefined access levels (e.g., Levels 0-6). In the example of FIG. 2, level 2 is associated with the selected privacy setting, which allows HLOS applications using TEE 124 support to process sensor data. For example, the HLOS applications may be executed based on data stored in a secure area of memory. Thus, TEE 124 controls the HLOS applications, which can receive audio and imaging sensor data from audio and imaging subsystems 132 and 136.

Figure 3:
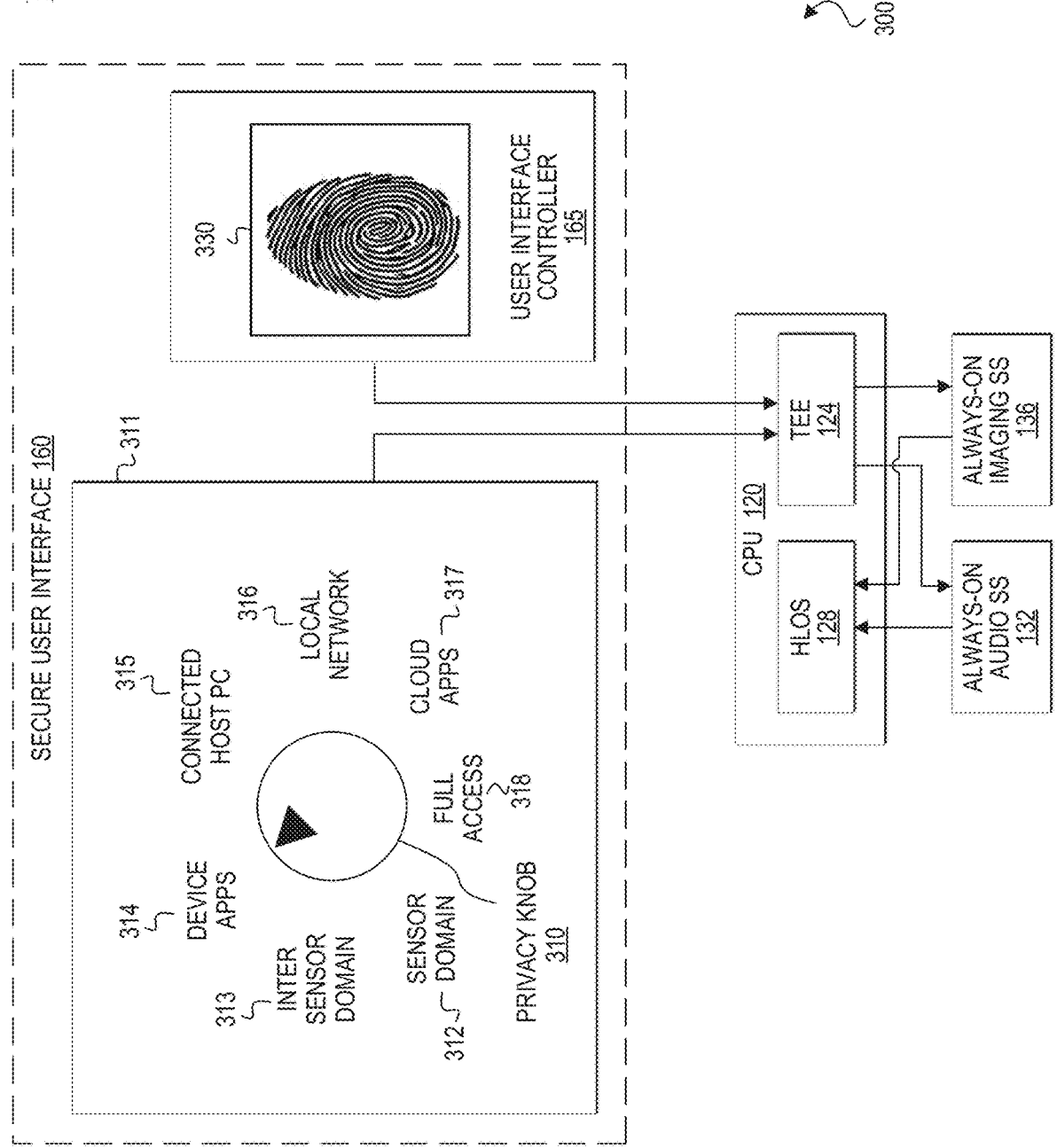
FIG. 3 is a simplified illustration of another embodiment of a secure user interface for hardware-assisted privacy protection of sensor data according to at least one embodiment.

FIG. 3 is a simplified illustration of one example implementation 300 of hardware-assisted privacy protection for dynamically changing an access level for sensor data and post processed data in an always-on device, such as device 100. In FIG. 3, certain components of device 100 are shown to illustrate the example implementation of hardware-assisted privacy protection. In particular, the components shown in FIG. 3 include CPU 120 with high level operating system (HLOS) 128 and trusted execution environment (TEE) 124, always-on audio subsystem 132, always-on imaging subsystem 136, secure user interface 160, and user interface controller 165.

Secure user interface 160 includes user interface controller 165 and a privacy setting mechanism. In the example of FIG. 3, the privacy setting mechanism is a secure privacy knob 310. Secure privacy knob 310 may be contained in a housing 311 of device 100, which is shaped to hold the components of device 100 in a suitable arrangement to enable the components to achieve their intended functionality. Housing 311 may be made of any suitable materials including, but not necessarily limited to, metals (e.g., aluminum alloys), lightweight materials, plastics, or any suitable combination thereof. Privacy knob 310 may be mechanically rotatable for selecting privacy settings associated with the various access levels. In this example, the privacy settings include sensor domain 312, inter-sensor domain 313, device apps 314, connected host PC apps 315, local network 316, cloud apps 317, and full access 318. In one example, as the privacy knob 310 rotates clockwise among privacy settings, the selectable privacy settings correspond to higher access levels that can be applied to the sensor data to decrease privacy restrictions. As the privacy knob 310 rotates counter-clockwise, the selectable privacy settings correspond to lower access levels that can be applied to the sensor data to increase privacy restrictions. In other examples, the privacy knob could be implemented to rotate in a single direction (i.e., clockwise or counter-clockwise) and a position of the knob is detected to determine which privacy setting is selected.

In one example, privacy knob 310 may be implemented using an incremental or absolute rotary encoder. A rotary encoder is a sensor that measures the angular position of privacy knob. Mechanical displacements of the privacy knob are converted to electrical signals that can be sent to CPU 320 to be interpreted. Rotary encoders may be implemented using optical, mechanical, or magnetic technologies. An incremental rotary encoder detects changes in the angular displacement of the privacy knob. An absolute rotary encoder detects the absolute angle of an encoded shaft of the privacy knob. Although a rotary encoder may be used in one or more embodiments to implement privacy knob 310, any other suitable mechanism for converting mechanical rotations to electrical signals may also be used. For example, potentiometers and/or rotary switches may be used in other embodiments.

There may be a trade-off between the privacy restrictions versus feature capabilities possible at each access level. Decreasing the privacy restrictions by rotating secure privacy knob 310 clockwise may result in increasing features and capabilities for the sensor data with hardware accelerated data processing and analytics for the sensor data becoming more available. Conversely, increasing privacy restrictions by rotating secure privacy knob 310 counter-clockwise may result in decreasing features and capabilities as fewer entities can access the sensor data. For example, a privacy setting corresponding to the lowest access level (Level 0) may be selected when the privacy knob is rotated as far counter-clockwise as possible. When a privacy setting corresponding to access level 0 is selected, the access to sensor data is the most restrictive. In this scenario, sensor data remains within the sensor subsystem domain, where very limited data processing is possible. As the privacy knob 310 is rotated clockwise to privacy settings corresponding to higher access levels (e.g., Levels 1-6), incrementally fewer privacy restrictions on sensor data are enforced, and more functionalities can be enabled. As privacy restrictions decrease at each higher access level, the domains within which the sensor data may be shared widen. Accordingly, greater processing power and analytics engines may be available at those higher access levels for the sensor data.

Secure privacy knob 310 may be secured, at least in part, by user interface controller 165 to ensure that only an authorized user is permitted to change the privacy settings of sensor data generated by device 100. In the example implementation 300 of FIG. 3, user interface controller 165 may include a fingerprint sensor for detecting and recognizing a fingerprint 330 of the user. In at least one embodiment, one or more prompts may be provided on the screen display to notify the user that authentication is required in order to unlock the privacy knob. The fingerprint may be provided to device 100 using any suitable fingerprint receiving device, such as a fingerprint-sensitive button or a designated area on the touch screen, for example. Authentication input information (e.g., fingerprint 330) may be provided to TEE 124 via an interface of user interface controller 165 and processed by TEE 124 in a secure environment. If the authentication passes, then TEE 124 can cause secure privacy knob 310 to be unlocked with the various privacy settings being selectable by the user. If the authentication fails, then TEE 124 does not unlock secure privacy knob 310 and privacy settings of sensor data (e.g., from audio subsystem 132 and imaging subsystem 136) are not selectable by the user.

In at least one embodiment, TEE 124 may manage the locking and unlocking of the privacy knob. In one example, the signal that is sent to the TEE 124 in response to a user's selection of a privacy setting may be intercepted by the TEE 124. TEE 124 may determine whether a successful authentication of the user has not expired. If the user has already been successfully authenticated and the authentication has not expired, then the TEE 124 may process the selection signal from the privacy knob and change the access level to the sensor data based on the newly selected privacy setting. If the user has not been successfully authenticated or if a prior successful authentication has expired, then the TEE 124 may block the selection signal and not allow the access level to the sensor data to be changed.

TEE 124 is also connected to an interface of secure privacy knob 310 to receive indications of a selected privacy setting. When TEE 124 receives an indication that a privacy setting has been selected, the TEE 124 enforces data boundary gating according to an appropriate one of two or more predefined access levels (e.g., Levels 0-6). In the example of FIG. 3, device apps 314 is a privacy setting and is selected, which allows HLOS applications using TEE 124 support to process sensor data. For example, the HLOS applications may be executed based on data stored in a secure area of memory. Thus, TEE 124 controls the HLOS applications, which can receive audio and imaging sensor data from audio and imaging subsystems 132 and 136.

Figure 4:
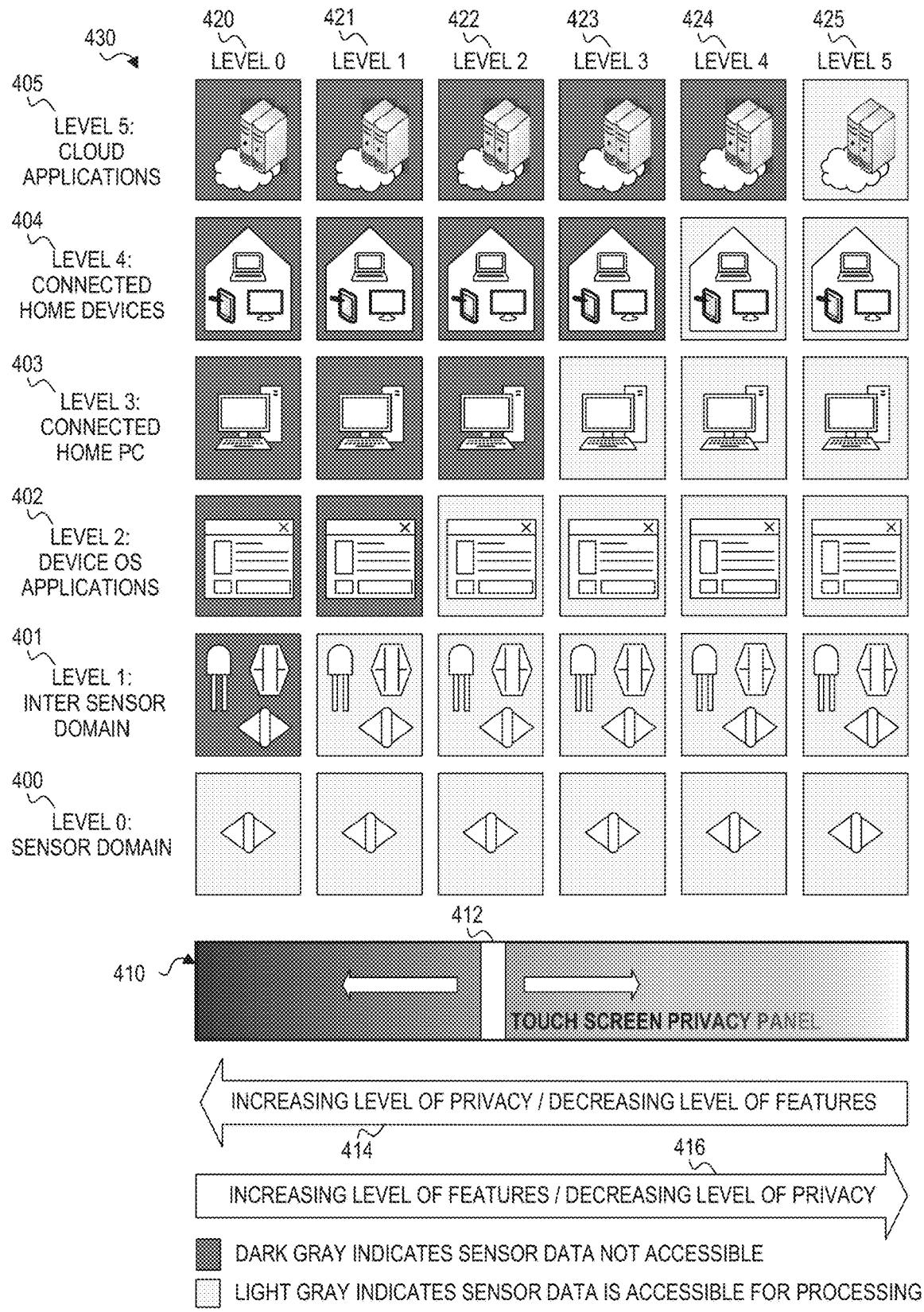
FIG. 4 is a graphical illustration of multi-level access control of sensor data and a secure user interface for selecting a desired access level for the sensor data according to at least one embodiment.

FIG. 4 is a simplified block diagram of an example secure touch screen privacy panel 410 with a slider bar 412 and a graphical illustration 430 of access levels corresponding to privacy settings that may be selected with the secure touch screen privacy panel and slider bar, according to at least one embodiment. In at least one embodiment, the graphical illustration 430 could be displayed on a display screen with secure touch screen privacy panel 410. In other embodiments, the secure touch screen privacy panel may be displayed without the graphical illustration 430 of the access levels. In at least some embodiments, a more simplified illustration and/or explanation of the access levels may be provided in the touch screen display with the touch screen privacy panel. In yet other embodiments, the secure touch screen privacy panel and slider bar may be displayed without any illustrations or explanations of the access levels.

The access levels can include multiple levels (e.g., Level 0, Level 1, Level 2, Level 3, Level 4, and Level 5), which represent various degrees of privacy restrictions and feature capabilities for sensor data collected by a device. Graphical illustration 430 includes domain blocks that show a different domain in each row for each access level. Row 400 includes domain blocks for sensor domains, row 401 includes domain blocks for an inter-sensor domain, row 402 includes domain blocks for device operating system (OS) applications domain, row 403 includes domain blocks for a connected device domain, row 404 includes domain blocks for connected home devices (e.g., local network), and row 405 includes domain blocks for approved cloud applications. Each column graphically represents the domains that can and cannot access sensor data for a selected access level. Each column also graphically aligns with a selectable privacy setting in touch screen privacy panel 410. Slider bar 412 can be moved via the touch screen to overlay a desired selectable privacy setting, indicating which access level (i.e., illustrated in the aligned column) is to be applied to the sensor data. For example, slider bar 412 in FIG. 4 overlays a selectable privacy setting aligned with column 422. This privacy setting can be selected (e.g., by the slider bar hovering over the privacy setting, by the user clicking when the slider bar overlays the privacy setting, etc.) to cause sensor data to be restricted based on access level 2. As shown in column 422, the domain blocks corresponding to row 403 (i.e., level 3), row 404 (i.e., level 4), and row 405 (i.e., level 5) have a dark shade, which indicates that entities in these domains cannot access sensor data when privacy restrictions are based on level 2. The domain blocks corresponding to row 402 (i.e., level 2), row 401 (i.e., level 1), and row 400 (i.e., level 0) have a light shade, which indicates that entities in these domains can access sensor data when privacy restrictions are based on level 2.

As previously described, there may be a trade-off between the privacy restrictions versus feature capabilities possible at each access level. As indicated at 414, increasing the privacy restrictions by moving slider bar 412 to the left may result in decreasing features and capabilities for the sensor data. As indicated at 416, decreasing privacy restrictions by moving slider bar 412 to the right may result in increasing features and capabilities with hardware accelerated data processing and analytics for the sensor data.

Figure 5A:
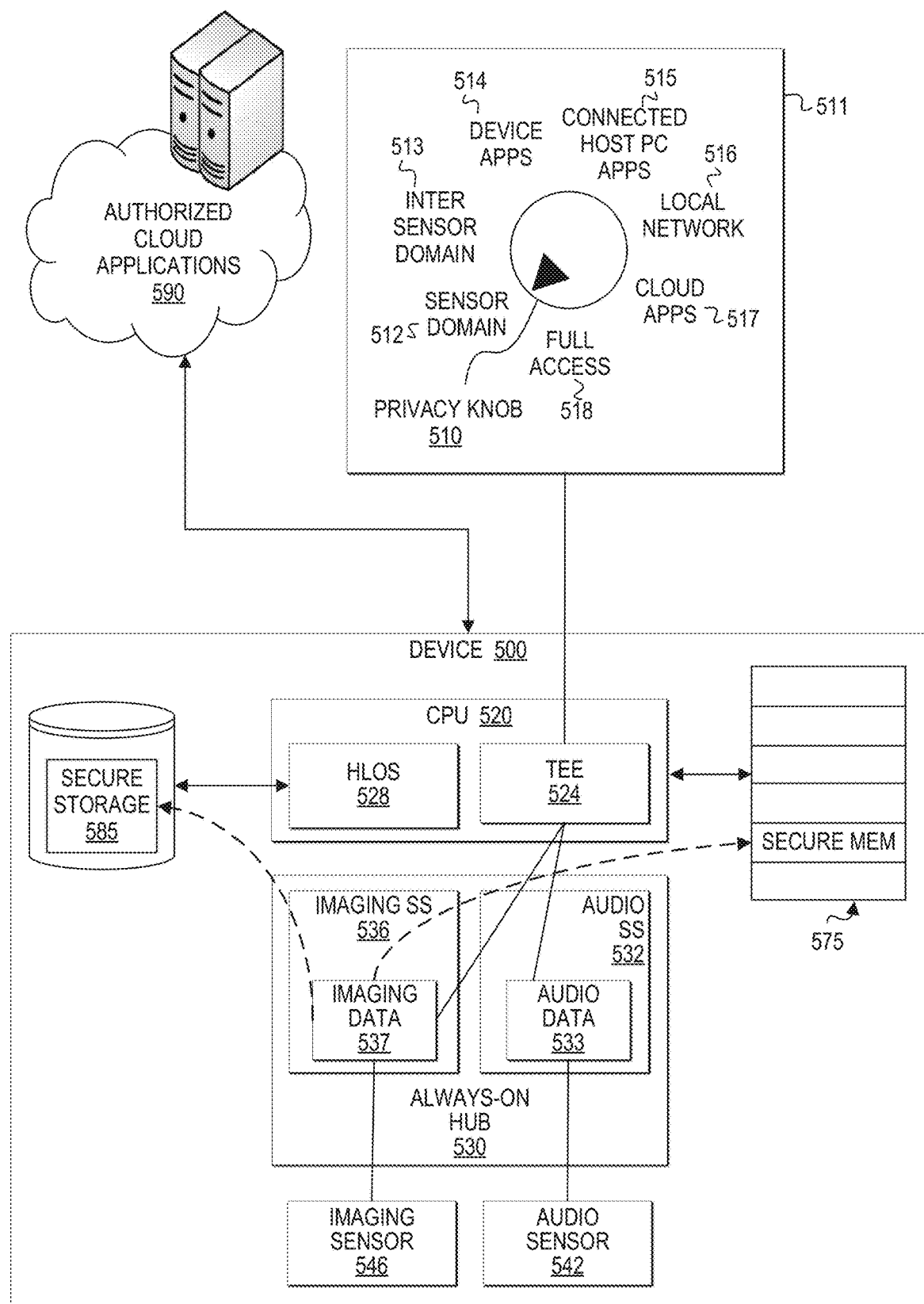
FIG. 5A is a simplified block diagram illustrating example flows of data when a selected privacy setting causes sensor data to be restricted based on an access level according to at least one embodiment.
Figure 5B:
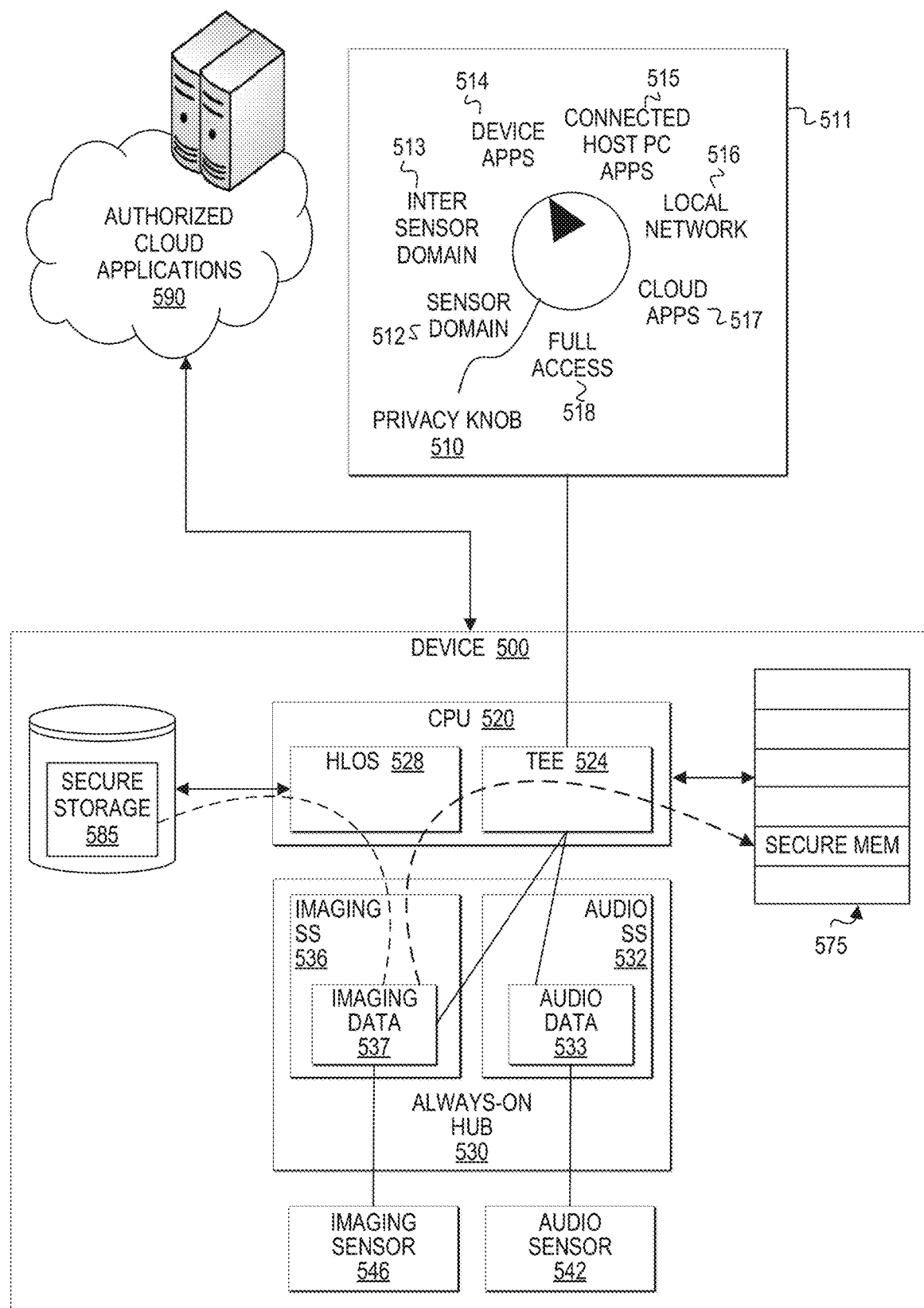
FIG. 5B is a simplified block diagram illustrating example flows of data when another selected privacy setting causes sensor data to be restricted based on an access level according to at least one embodiment.
Figure 5C:
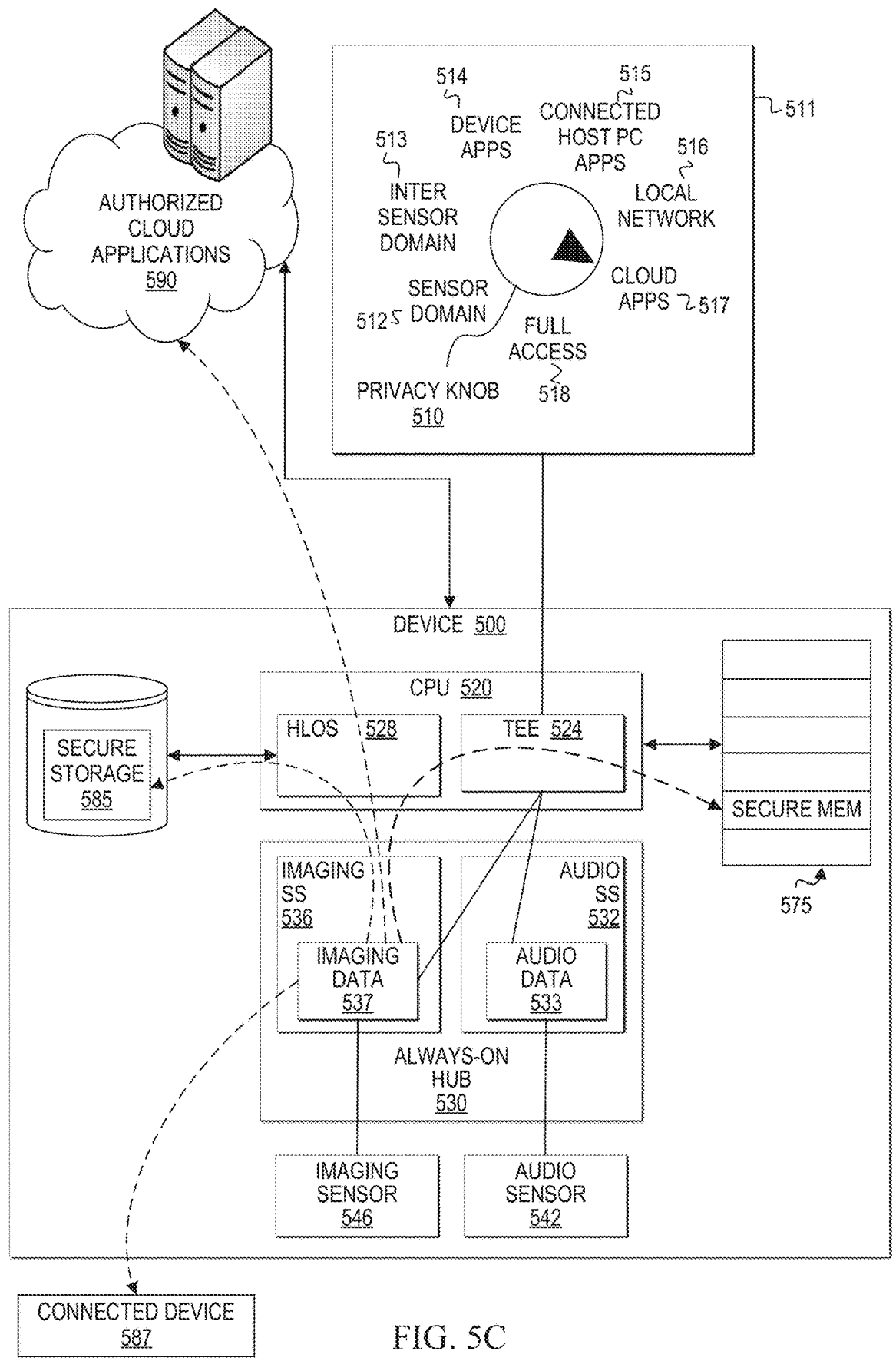
FIG. 5C is a simplified block diagram illustrating example flows of data when yet another selected privacy setting causes sensor data to be restricted based on an access level according to at least one embodiment.

Turning to FIGS. 5A-5C, FIGS. 5A-5C are simplified block diagrams illustrating examples of data access and data flows for sensor data with different access levels in a device 500. Device 500 may be configured in the same or similar manner as device 100. Example components of device 500 include a CPU 520 with a high level operating system (HLOS) 528 and a trusted execution environment (TEE) 524, an always-on hub 530 with an audio subsystem 532, an audio sensor 542, an imaging subsystem 536, an imaging sensor 546, memory with at least some secure memory 575, and secure storage 585. The components of device 500 may be configured in the same or similar manner as components of device 100, which was previously shown and described herein. For example, CPU 520, HLOS 528, TEE 524, always-on hub 530, audio subsystem 532, audio sensor 542, imaging subsystem 536, imaging sensor 546, secure memory 575, and secure storage 585 may be configured in the same or similar manner as CPU 120, HLOS 128, TEE 124, always-on hub 130, audio subsystem 132, audio sensor 142, imaging subsystem 136, imaging sensor 146, secure memory 175, and secure storage 185, respectively. In FIG. 5A, imaging sensor 546 and audio sensor 542 are always-on and therefore, continuously collect images and sounds, respectively. Imaging data 537 collected by imaging sensor 546 can be sent to imaging subsystem 536. Audio data 533 collected by audio sensor 542 can be sent to audio subsystem 532.

Device 500 may also include a secure privacy knob 510 with various privacy settings including a sensor domain setting 512, an inter-sensor domain setting 513, a device apps (applications) setting 514, a connected host PC apps (applications) setting 515, a local network setting 516, a cloud apps setting 517, and a full access setting 518. Privacy knob 510 may be contained in a housing 511 of device 500, which is shaped to hold the components of device 500 in a suitable arrangement to enable the components to achieve their intended functionality. Housing 511 may be made of any suitable materials including, but not necessarily limited to, metals (e.g., aluminum alloys), lightweight materials, plastics, or any suitable combination thereof. Secure privacy knob 510 and its settings may be configured in the same or similar manner as secure privacy knob 310 and its settings, which were previously shown and described herein.

Device 500 may be connected to external entities such as devices (not shown), local networks (not shown), and authorized cloud applications 590. Cloud applications 590 may be accessible via any suitable network, as previously described herein. External entities may offer enhanced processing and data analytics for sensor data. For example, another device connected to device 500 may provide processing and data analytics for sensor data that are more advanced than the processing and data analytics available in device 500. Other devices connected to device 500 via a home or local area network may provide processing and data analytics for sensor data that are more advanced than the processing and data analytics available in device 500 and in the device connected to device 500. Cloud applications 590 may provide processing and data analytics for sensor data that are more advanced than the processing and data analytics available in device 500, the device connected to device 500, and the devices of a local area network to which device 500 is connected.

FIG. 5A illustrates examples of data access and data flows of sensor data when the selected privacy setting of the secure privacy knob 510 is sensor domain (e.g., level 0). When a privacy setting is selected by turning secure privacy knob 510 to the privacy setting that corresponds to the desired access level, a signal is sent to TEE 524 to indicate which privacy setting has been selected. When TEE 524 receives an indication that a privacy setting associated with a particular access level has been selected, TEE 524 enforces data boundary gating according to the particular access level. Thus, in FIG. 5A, a mechanical selection of sensor domain setting 512 using secure privacy knob 510 is converted to an electronic signal that is sent to TEE 524 and indicates that sensor domain setting 512 has been selected. TEE 524 enforces the boundary defined by the sensor domain access level (e.g., level 0) corresponding to sensor domain setting 512. For the sensor domain access level, sensor data for a given sensor is accessible only by its own sensor subsystem. In the example of FIG. 5A, imaging data 537 captured by imaging sensor 546 may only be processed by imaging subsystem 536. Imaging data 537 may be stored in secure storage 585 and/or secure memory 575 but may not be shared with any other internal or external entities. Similarly, audio data 533 captured by audio sensor 542 may only be processed by audio subsystem 532 and stored in secure storage 585 and/or secure memory 575 but may not be shared with any other entities internal or external to device 500.

FIG. 5B illustrates examples of data access and data flows of sensor data when the selected privacy setting of the secure privacy knob 510 is device apps setting 514 (e.g., level 2). In FIG. 5B, a mechanical selection of device apps setting 514 using secure privacy knob 510 is converted to an electronic signal that is sent to TEE 524 and indicates that device apps setting 514 has been selected. TEE 524 enforces the boundary defined by the device apps access level (e.g., level 2) corresponding to device apps setting 514. For the device apps access level, sensor data for a given sensor is accessible by any sensor subsystem (e.g., imaging subsystem 536, audio subsystem 532) and by applications in the host processor (e.g., high level operating system 528). In the example of FIG. 5B, imaging data 537 captured by imaging sensor 546 may be processed by imaging subsystem 536, audio subsystem 532, and/or applications in HLOS 528.

Imaging data 537 may be stored in secure storage 585 and/or secure memory 575 but may not be shared with any other entities external to device 500. Similarly, audio data 533 captured by audio sensor 542 may be processed by imaging subsystem 536, audio subsystem 532, and/or applications in HLOS 528. Audio data 533 may be stored in secure storage 585 and/or secure memory 575 but may not be shared with any other entities external to device 500.

FIG. 5C illustrates examples of data access and data flows of sensor data when the selected privacy setting is cloud apps 517 (e.g., level 5). In FIG. 5C, a mechanical selection of cloud apps setting 517 using secure privacy knob 510 is converted to an electronic signal that is sent to TEE 524 and indicates that cloud apps setting 517 has been selected. TEE 524 enforces the boundary defined by the cloud apps access level (e.g., level 5) corresponding to cloud apps setting 517. For the cloud apps access level, sensor data for a given sensor is accessible by any sensor subsystem (e.g., imaging subsystem 536, audio subsystem 532), by applications in the host processor (e.g., high level operating system 528), by connected devices 587 (e.g., either directly connected or via a home or local network), and cloud applications available in cloud applications 590. Cloud applications 590 may represent services of certified servers or otherwise authorized services. In the example of FIG. 5C, imaging data 537 captured by imaging sensor 546 may be processed by imaging subsystem 536, audio subsystem 532, applications in HLOS 528, applications in connected device 587, and/or cloud applications provided in cloud applications 590. Imaging data 537 may be stored in secure storage 585 and/or secure memory 575 but may not be shared with any non-certified or otherwise unauthorized entities external to device 500. Similarly, audio data 533 captured by audio sensor 542 may be processed by imaging subsystem 536, audio subsystem 532, applications in HLOS 528, applications in connected device 587 (e.g., either directly connected or via a home or local network), and/or cloud applications 590. Audio data 533 may be stored in secure storage 585 and/or secure memory 575 but may not be shared with any non-certified or otherwise unauthorized entities external to device 500.

Figure 6:
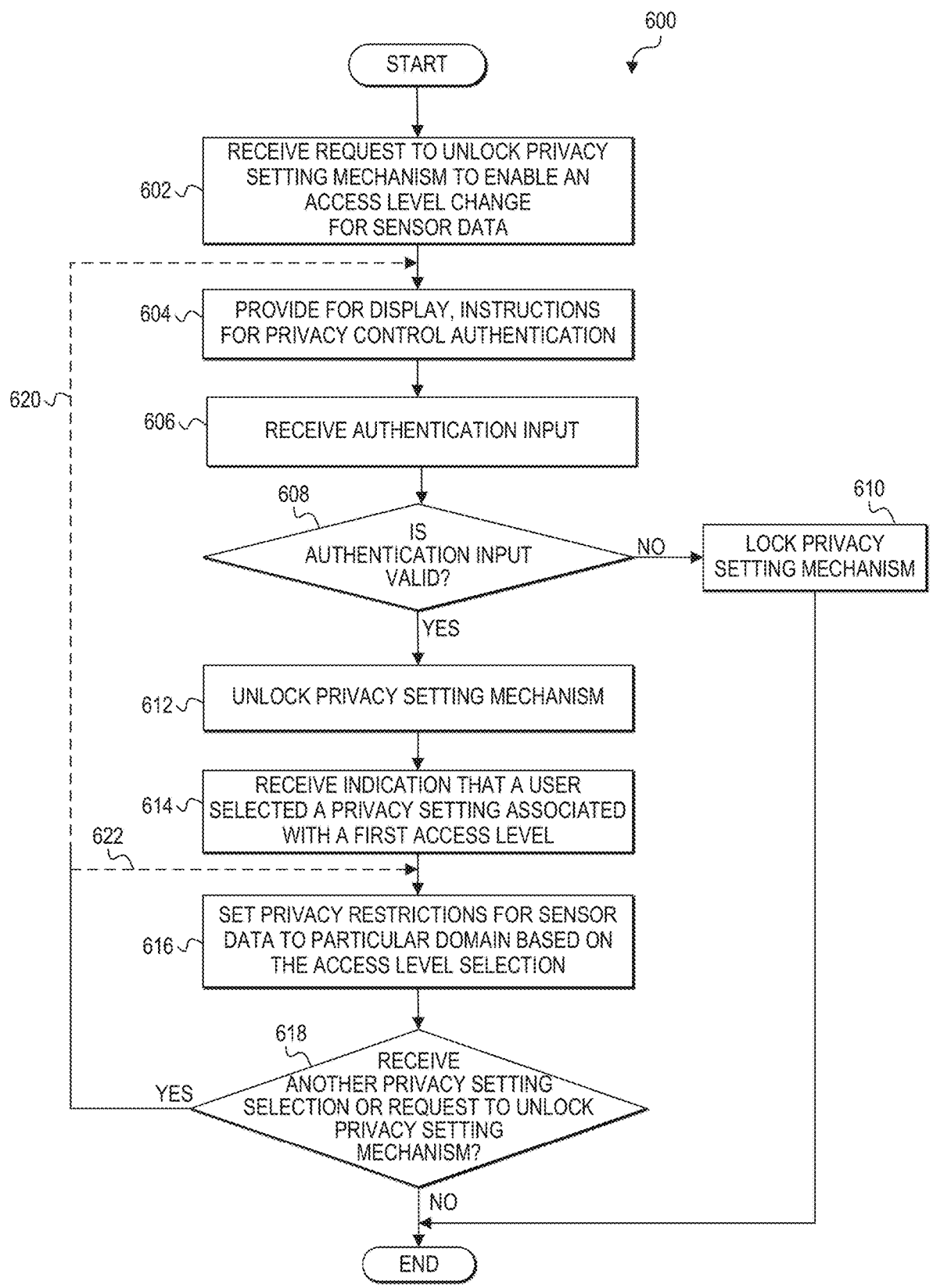
FIG. 6 is a simplified flow chart of potential operations associated with hardware-assisted privacy protection of sensor data with a secure user interface according to at least one embodiment.
Figure 7:
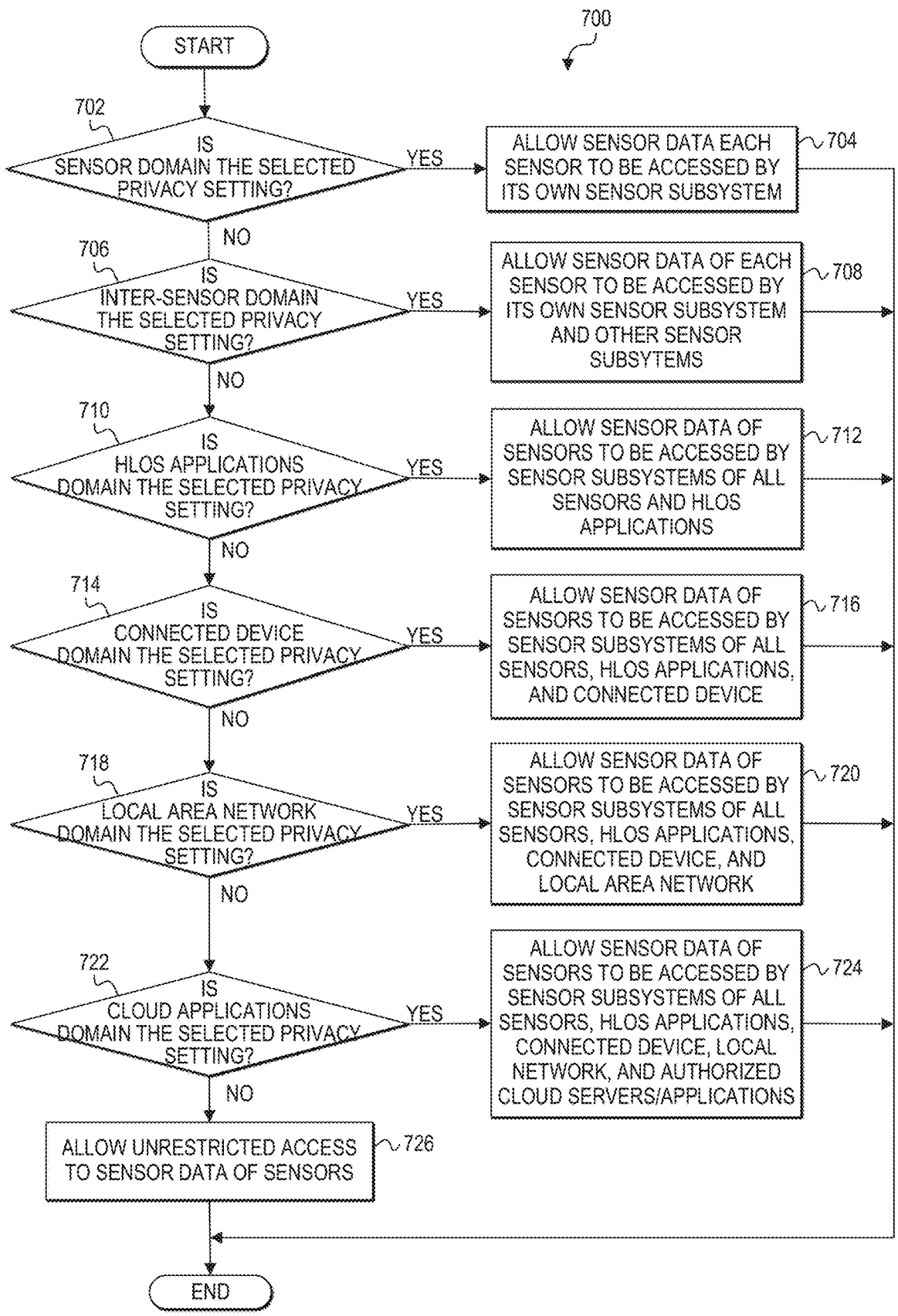
FIG. 7 is a simplified flow chart of other potential operations associated with hardware-assisted privacy protection of sensor data with a secure user interface according to at least one embodiment.

Turning to FIGS. 6-7, FIGS. 6 and 7 are simplified flow charts 600 and 700, respectively, illustrating example operations that may be associated with embodiments of hardware-assisted privacy protection using a secure user interface. In at least one embodiment, one or more sets of operations correspond to activities of FIGS. 6-7. A device with hardware-assisted privacy protection using a secure user interface (e.g., device 100, device 500), or a portion thereof, may utilize the one or more sets of operations. The device may comprise means such as a processor (e.g., 120, 520), for performing the operations. In an embodiment, a security engine (e.g., 180), a secure user interface (e.g., 160), and/or a user interface controller 165 can perform at least some operations of flow charts 600 and 700.

At 602 of FIG. 6, a request is received to unlock a privacy setting mechanism (e.g., touch screen privacy panel 210, 410 with a slider bar 212, 412, secure privacy knob 310, 510, etc.) to enable a change to be made by a user to the access level to sensor data. At 604, a prompt that includes one or more instructions for privacy control authentication is provided for display on a screen display (e.g., 150) of the device. The privacy control authentication may be required to determine whether a user is authorized to change the access level for sensor data in the device. At 606, authentication input is received from a user via the screen display (e.g., password, security questions, etc.) or other input mechanism configured to receive authentication information (e.g., fingerprint reader, other biometric information reader, etc.).

At 608, if a determination is made that the authentication input is not valid, then at 610, the privacy setting mechanism (e.g., touch screen privacy panel 210, 410 with a slider bar 212, 412, privacy knob 310, 510, etc.) is locked and does not allow any adjustments to the privacy restrictions applied to sensor data.

At 608, if it is determined that the authentication input is valid, then at 612, the privacy setting mechanism is unlocked and allows the privacy setting to be changed. Thus, privacy restrictions applied to sensor data can be adjusted by changing the current privacy setting to a different privacy setting that corresponds with a desired access level. This change can be selected via the unlocked privacy setting mechanism, such as a touch screen privacy panel with a slider bar or a privacy knob.

At 614, an indication that a user selected a privacy setting associated with a first access level is received. For example, if a user changes privacy knob 510 from sensor domain setting 512 to device apps setting 515, then an electronic signal can be received by the TEE processor indicating that the device apps setting 515 has been selected.

At 616, privacy restrictions for sensor data (e.g., collected sensor data, post-processed sensor data) can be applied to a particular domain based on the selected access level. This will be further described with reference to FIG. 7.

At 618, a determination is made as to whether another privacy setting has been selected or whether a request has been received to unlock the privacy setting mechanism if it is locked again. In one embodiment, once the access level has been changed and appropriate privacy restrictions have been applied to the sensor data, changing the access level again requires the user to be reauthenticated. In this embodiment, flow returns to 604, as indicated by flow line 620, where a prompt that includes one or more instructions for privacy control authentication is provided for display on a screen display (e.g., 150) of the device. The privacy control authentication may be required to reauthorize the user to change the access level for sensor data in the device. Once the user is reauthorized at 606-608, the privacy setting mechanism can be unlocked again at 612 and the user can change the access level as previously described herein.

In another scenario, reauthentication may be determined based on a selected or preconfigured amount of time. A timer based on the preconfigured amount of time may begin running when a user is successfully authenticated. The user may continue to make changes to the access level until the timer expires. Once the timer expires, the privacy setting mechanism may be locked and the user may have to be reauthenticated to unlock the privacy setting mechanism.

In another embodiment, once a user is successfully authenticated, the privacy setting mechanism may remain unlocked until the device is powered down or reboots. In this example, a user may change the privacy setting (and its corresponding access level) at any time after authentication is successful and while the device remains powered on. Thus, if new privacy setting selection corresponding to a new access level is received at 618, then flow passes to 616, as indicated by flow line 622, where privacy restrictions are applied to sensor data for a particular domain based on the new access level.

FIG. 7 illustrates additional possible details of operations that may be performed at 616 of flow chart 600. At 616, a user has been authenticated, the privacy setting mechanism has been unlocked, and a privacy setting corresponding to an access level has been selected. At 702, a determination is made as to whether sensor domain is the selected privacy setting. If sensor domain is the selected privacy setting, then at 704, privacy restrictions can be applied to restrict access to sensor data to allowing access by each sensor domain. For example, audio sensor data is restricted to being accessed by the audio subsystem but no other internal or external entities, and imaging sensor data is restricted to access by the imaging subsystem but no other internal or external entities.

If it is determined, at 702, that the sensor domain is not the selected privacy setting, then at 706, a determination is made as to whether inter-sensor domain is the selected privacy setting. If the inter-system domain is the selected privacy setting, then at 708, privacy restrictions can be applied to restrict access to sensor data to an inter-sensor domain. For example, audio sensor data is restricted to being accessed by all sensor subsystems (e.g., the audio subsystem, imaging subsystem, the sensor hub subsystem, etc.), but not other internal or external entities.

If it is determined, at 706, that the inter-sensor domain is not the selected privacy setting, then at 710, a determination is made as to whether device applications is the selected privacy setting. If the device applications domain is the selected privacy setting, then at 712, privacy restrictions can be applied to restrict access to sensor data to a device applications domain, which includes the inter-sensor domain and each sensor subsystem domain. For example, audio sensor data is restricted to being accessed by applications on the device (e.g., applications run by a high level operating system (HLOS)) and all sensor subsystems (e.g., the audio subsystem, imaging subsystem, the sensor hub subsystem, etc.), but not external entities.

If it is determined, at 710, that the device applications domain is not the selected privacy setting, then at 714, a determination is made as to whether a connected device domain is the selected privacy setting. If the connected device domain is the selected privacy setting, then at 716, privacy restrictions can be applied to restrict access to sensor data to a connected device domain, which includes the device applications domain. The device applications domain of the device collecting sensor data includes the inter-sensor domain and each sensor subsystem domain. For example, when the connected device domain setting is selected, audio sensor data is restricted to being accessed by a device (e.g., personal computer or server) connected to the device collecting the sensor data, applications on the device collecting the sensor data (e.g., applications run by a HLOS), and all sensor subsystems (e.g., the audio subsystem, imaging subsystem, the sensor hub subsystem, etc.), but not other external entities.

If it is determined, at 714, that the connected device domain is not the selected privacy setting, then at 718, a determination is made as to whether a local area network domain is the selected privacy setting. If the local area network domain is the selected privacy setting, then at 720, privacy restrictions can be applied to restrict access to sensor data based on a local area network domain, which includes the connected device domain, the device apps domain, the inter-sensor domain, and each sensor subsystem domain. For example, when the local area network domain setting is selected, audio sensor data is restricted to being accessed by one or more devices in a local area network (e.g., home network) to which the device collecting the sensor data belongs, a device (e.g., personal computer or server) connected to the device collecting the sensor data, applications on the device collecting the sensor data (e.g., applications run by a HLOS) collecting the sensor data, and all sensor subsystems (e.g., the audio subsystem, imaging subsystem, the sensor hub subsystem, etc.), but not other external entities.

If it is determined, at 718, that the local area network domain is not the selected privacy setting, then at 722, a determination is made as to whether a cloud applications domain is the selected privacy setting. If the cloud applications domain is the selected privacy setting, then at 724, privacy restrictions can be applied to restrict access to sensor data based on a cloud applications domain. The cloud applications domain includes the local area network domain, the connected device domain, the device apps domain, the inter-sensor domain, and each sensor subsystem domain. For example, when the cloud applications domain setting is selected, audio sensor data is restricted to being accessed by authorized cloud applications (e.g., specified cloud applications, applications running on a certified cloud server, etc.), one or more devices in a local area network (e.g., home network) to which the device collecting the sensor data belongs, a device (e.g., personal computer or server) connected to the device collecting the sensor data, applications on the device (e.g., applications run by a HLOS) collecting the sensor data, and all sensor subsystems (e.g., the audio subsystem, imaging subsystem, the sensor hub subsystem, etc.), but not other external entities such as unauthorized cloud applications.

If it is determined, at 722, that the cloud applications domain is not the selected privacy setting, then at 726, any existing privacy restrictions may be removed, and the sensor data may be accessed by any internal or external application, server, device, software, hardware, firmware, etc.

Figure 8:
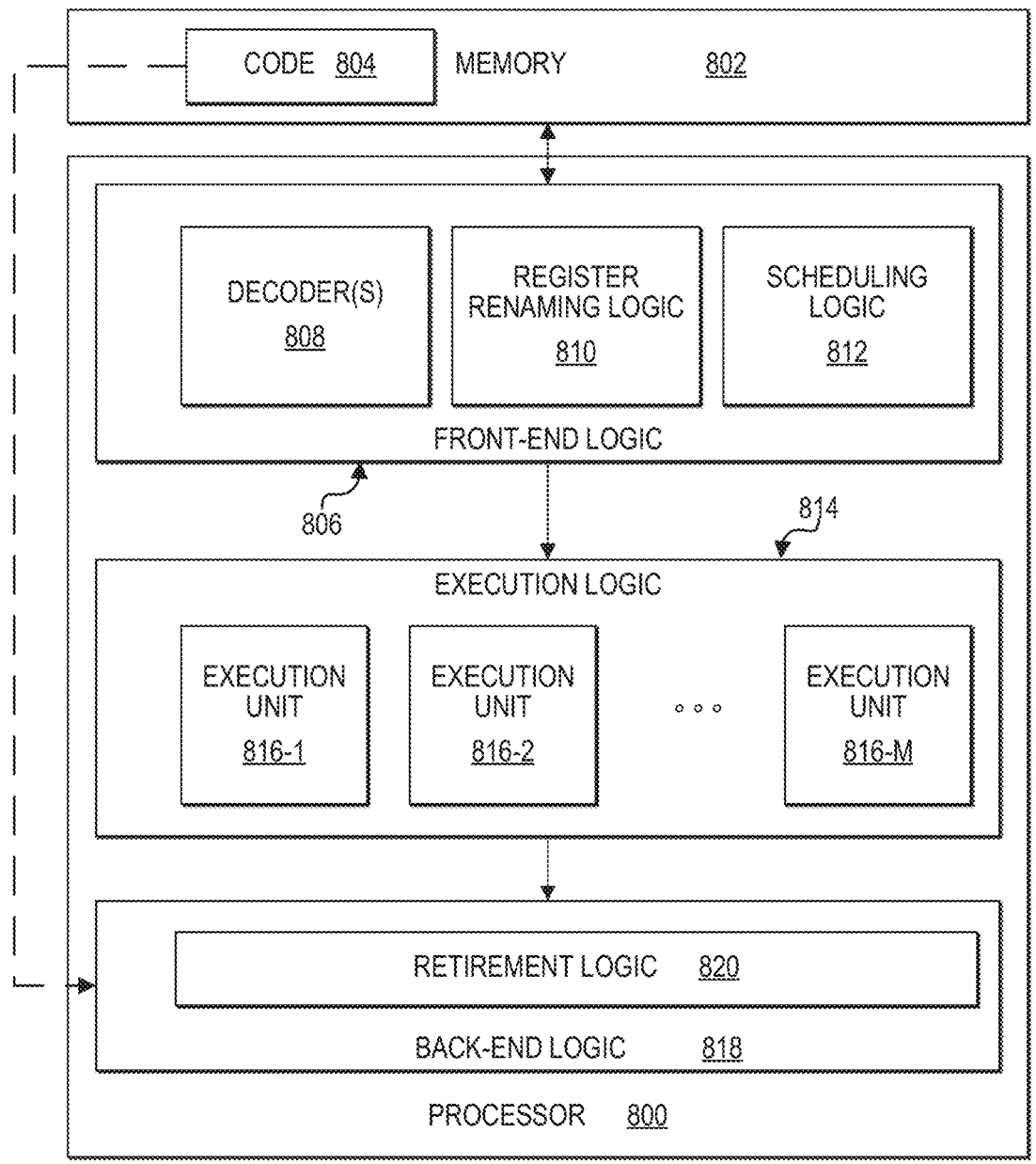
FIG. 8 is a block diagram illustrating an example processor core and memory according to at least one embodiment.

FIG. 8 is an example illustration of a processor according to an embodiment. Processor 800 is one example embodiment of processors that may be used in embodiments herein such as processors 120 and 520. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 is one example of memory elements 175, 190, 575, and 585. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM). Processor 800 can execute any type of instructions associated with the hardware-assisted privacy protection operations detailed herein. Generally, processor 800 can transform an element or an article (e.g., data) from one state or thing to another state or thing.

Code 804, which may be one or more instructions to be executed by processor 800, may be stored in memory 802. Code 804 can include instructions of various modules or portions thereof (e.g., secure user interface 160, user interface controller 165, security engine 180, TEE 124, HLOS applications, cloud applications 590, audio subsystem 132, 532, imaging subsystem 136, 536, sensor hub subsystem 134, etc.) that may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816-1 through 816-M. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

Figure 9:
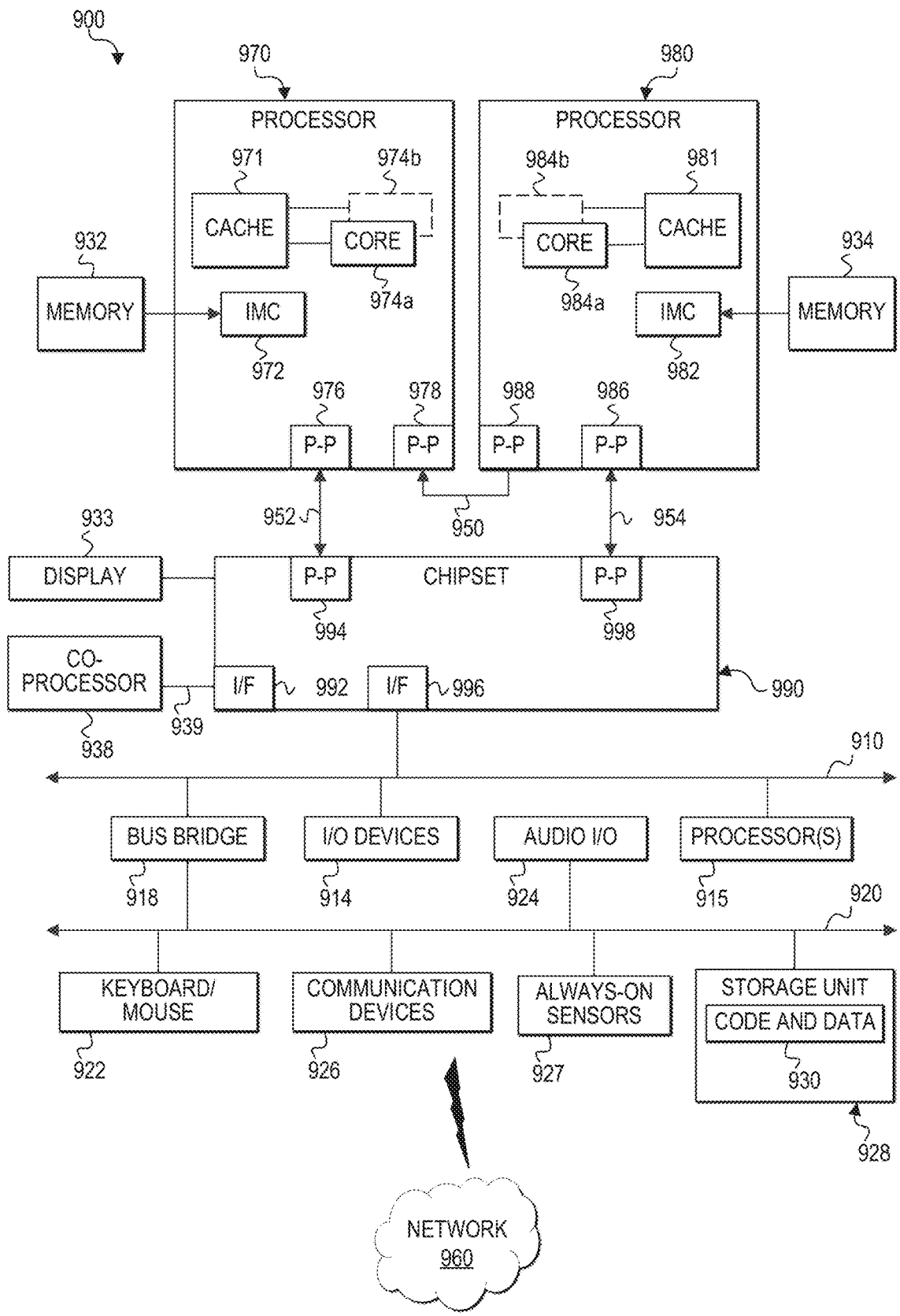
FIG. 9 is a block diagram of an example computer architecture according to at least one embodiment.
Figure 10:
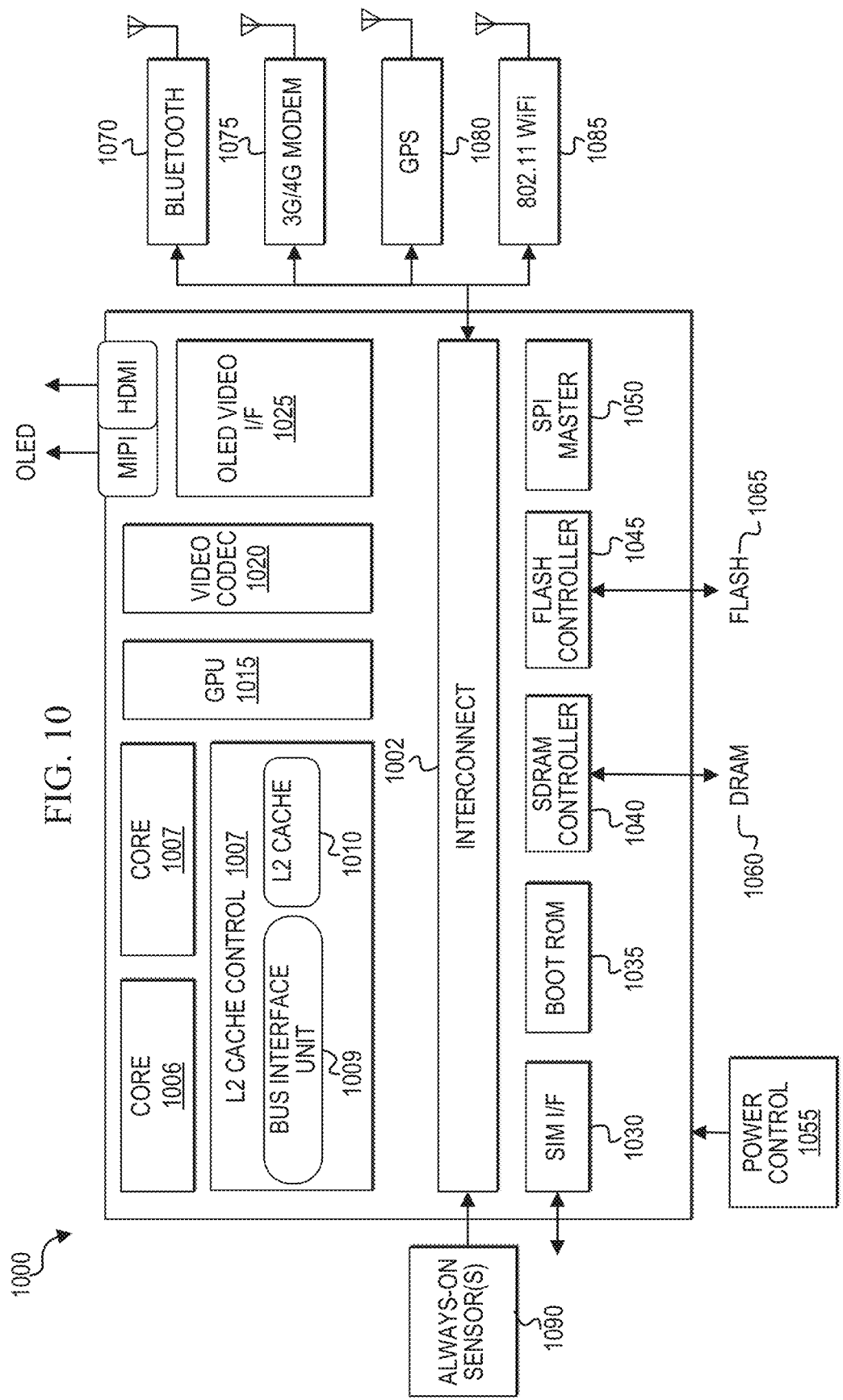
FIG. 10 is a block diagram of an example system-on-a-chip (SoC) computer architecture according to at least one embodiment.
Figure 11:
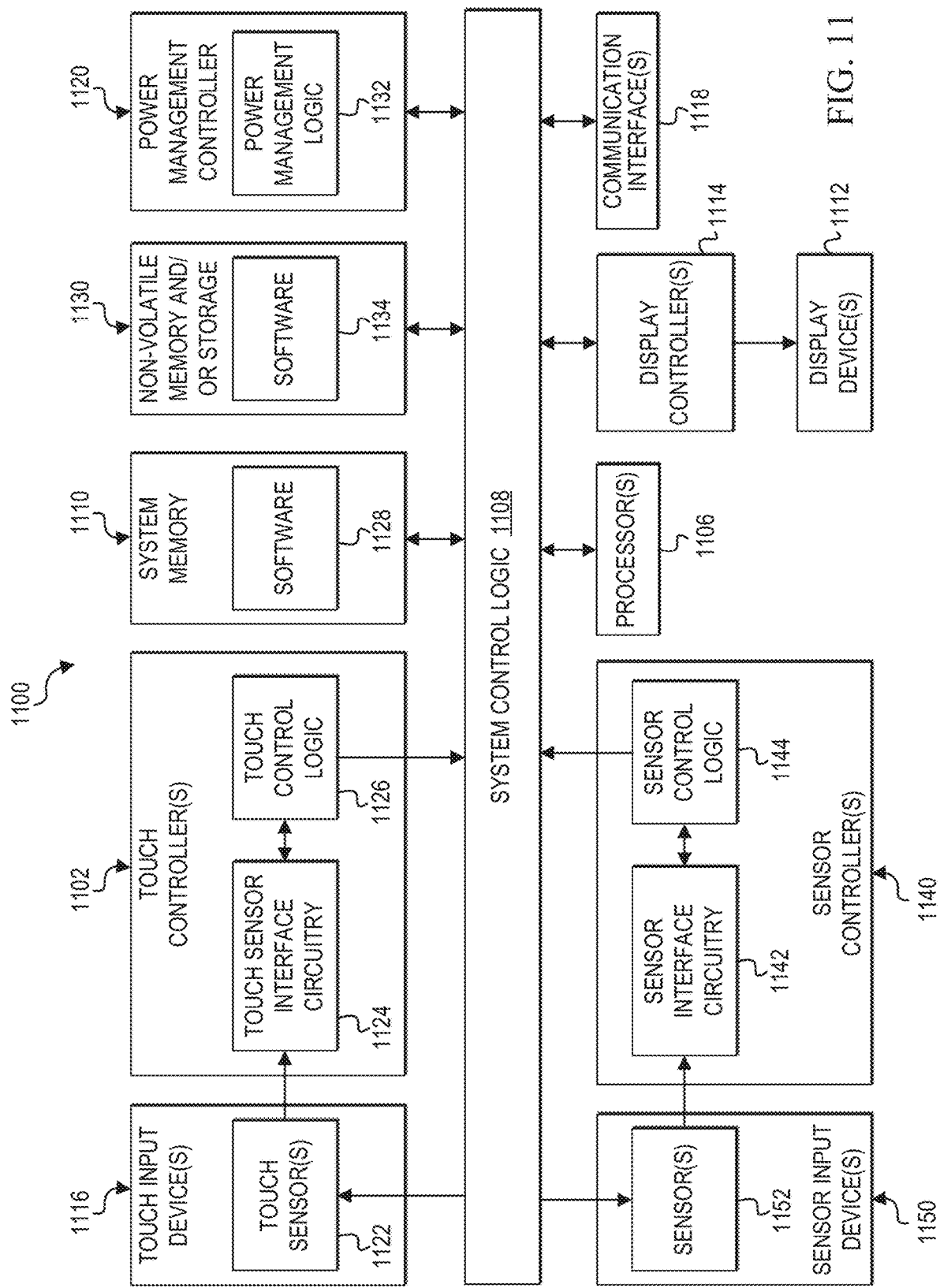
FIG. 11 is a simplified block diagram illustrating computer architecture and logic according to at least one embodiment.

FIGS. 9-11 are block diagrams of exemplary computer architectures. Other system designs and configurations known in the art for laptops, desktops, handheld PCs, personal digital assistants, engineering workstations, servers, network devices, network hubs, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of an example system 900 in accordance with one or more embodiments of the present disclosure. As shown in FIG. 9, multiprocessor system 900 is a point-to-point interconnect system, and includes a first processor 970 and a second processor 980 coupled via a point-to-point interconnect 950. In at least one embodiment, devices 100, 500, may be configured in the same or similar manner as exemplary computing system 900. Processors 970 and 980 may be any type of processor, such as those discussed with reference to processor 120 of FIG. 1, and processor 520 of FIGS. 5A-5C, and processor 800 of FIG. 8.

Processors 970 and 980 may be implemented as single core processors 974a and 984a or multi-core processors 974a-974b and 984a-984b. Processors 970 and 980 may each include a cache 971 and 981 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 970 and 980 are shown including integrated memory controller (IMC) units 972 and 982, respectively. IMCs 972 and 982 couple the processors to respective memories, namely a memory 932 and a memory 934, which may be portions of main memory locally attached to the respective processors. In alternative embodiments, memory controller logic 972 and 982 may be discrete logic separate from processors 970 and 980. Memory elements 932 and/or 934 may store various data to be used by processors 970 and 980 in achieving operations associated with hardware-assisted privacy protection using a secure user interface with multi-level access control of sensor data, as outlined herein.

Processors 970 and 980 may be any type of processor, those discussed with reference to processor 800 of FIG. 8, processor 120 of FIGS. 1-3, and processor 520 of FIGS. 5A-5C, for example. Processor 970 also includes as part of its bus controller units, point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like. Chipset 990 may also communicate with a display 933 for displaying data that is viewable by a human user.

As shown herein, chipset 990 is separated from processing elements 970 and 980. However, in an embodiment, chipset 990 is integrated on the same chip as processing elements 970 and 980. Also, chipset 990 may be partitioned differently with fewer or more integrated circuits.

Chipset 990 may be coupled to a first bus 910 via an interface 996. In one embodiment, first bus 910 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 910, along with a bus bridge 918 which couples first bus 910 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 910. I/O devices 914 may include peripheral devices (including sensors) that provide information and/or instructions to processors 970 and 980 for processing or storage. Some peripheral devices also (or alternatively) provide a way for processors 970 and 980 to output information to users or other computing systems. Sensors may include, for example, video and/or still image sensors, audio sensors, touch sensors, fingerprint sensors, eye sensors, facial features sensors, other biometric sensors, etc. In one example, at least one sensor detects user authentication input. Furthermore, in an embodiment, at least one sensor is in an always-on state.

In one embodiment, second bus 920 may be a low pin count (LPC) bus. Various devices may be coupled to a second bus 920 including, for example, a keyboard and/or mouse 922 (or other input devices such as a touch screen, trackball, joystick, etc.), communication devices 926 (such as modems, network interface devices, or other types of communication devices that may communicate through a network 960), always-on sensors (e.g., any sensor in an always-on state), and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

The computing system depicted in FIG. 9 is a schematic illustration of an embodiment that may be utilized to implement various embodiments discussed herein. It will be appreciated that various components of the system depicted in FIG. 9 may be combined in a system-on-a-chip (SoC) architecture or in any other suitable configuration capable of achieving the hardware-assisted privacy protection for sensor data, according to the various embodiments provided herein.

Turning to FIG. 10, FIG. 10 is a simplified block diagram associated with an example Advanced RISC Machines (ARM) ecosystem system-on-chip (SOC) 1000 of the present disclosure. At least one example implementation of the present disclosure can include the hardware-assisted privacy protection features for sensor data discussed herein and an ARM component. For example, in at least some embodiments, devices 100, 500, shown and described herein, could be configured in the same or similar manner ARM ecosystem SOC 1000. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, wearable electronic device, any type of touch-enabled input device, etc.

In this example of FIG. 10, ARM ecosystem SOC 1000 may include multiple cores 1006-1007, an L2 cache control 1007, a bus interface unit 1009, an L2 cache 1010, a graphics processing unit (GPU) 1015, an interconnect 1002, a video codec 1020, and an organic light emitting diode (OLED) I/F 1025, which may be associated with mobile industry processor interface (MIPI)/high-definition multimedia interface (HDMI) links that couple to an OLED display. In at least one embodiment that is implemented using an architecture such as SOC 1000, the TEE may be provisioned in a separate core inside the SOC.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, flash 1065, and one or more sensors 1090. At least one of the one or more sensors may be always-on sensors (e.g., 132, 134, 136, 532, 536, etc.), as previously described herein. In addition, one or more example embodiments include one or more communication capabilities, interfaces, and features such as instances of Bluetooth™ 1070, a 3G modem 1075, a global positioning system (GPS) 1080, and an 802.11 Wi-Fi 1085.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Turning to FIG. 11, FIG. 11 is a simplified block diagram illustrating potential electronics and logic that may be associated with one or more embodiments of devices discussed herein (e.g., 100, 500). Certain electronics and logic of FIG. 11 can be discrete or integrated into a converged mobility platform such as a System on a Chip (SOC) as disclosed for example with reference to FIG. 10. Alternatively, certain electronics and logic of FIG. 11 can be discrete or integrated into a big core platform such as a computing system as disclosed for example with reference to FIG. 10. Example implementations could include, but are not necessarily limited to, mobile phones, tablets, phablets, gaming systems, infotainment systems, laptops, desktops, wearable electronic devices, other electronic devices disclosed herein, etc.

In at least one example embodiment, system 1100 can include touch controller(s) 1102, sensor input controller(s) 1140, one or more processors 1106, system control logic 1108 coupled to at least one of processor(s) 1106, system memory 1110 coupled to system control logic 1108, non-volatile memory and/or storage device(s) 1130 coupled to system control logic 1108, display controller(s) 1114 coupled to system control logic 1108 and to display device(s) 1112, power management controller 1120 coupled to system control logic 1108, and/or communication interfaces 1118 coupled to system control logic 1108.

System control logic 1108, in at least one embodiment, can include any suitable interface controllers to provide for any suitable interface to at least one processor 1106 and/or to any suitable device or component in communication with system control logic 1108. System control logic 1108, in at least one embodiment, can include one or more memory controllers to provide an interface to system memory 1110. System memory 1110 may be used to load and store data and/or instructions, for example, for system 1100. System memory 1110, in at least one embodiment, can include any suitable volatile memory, such as suitable dynamic random access memory (DRAM) for example. System control logic 1108, in at least one embodiment, can include one or more I/O controllers to provide an interface to display device 1112, touch controller(s) 1102, sensor input controller(s) 1140, and non-volatile memory and/or storage device(s) 1130.

Non-volatile memory and/or storage device(s) 1130 may be used to store data and/or instructions, for example within software 1134. Non-volatile memory and/or storage device(s) 1130 may include any suitable non-volatile memory, such as flash memory for example, and/or may include any suitable non-volatile storage device(s), such as one or more hard disc drives (HDDs), solid state drives (SSDs), etc. for example.

Power management controller 1120 may include power management logic 1132 configured to control various power management and/or power saving functions. In at least one example embodiment, power management controller 1120 is configured to reduce the power consumption of components or devices of system 1100 that may either be operated at reduced power or turned off when the device (e.g., device 100) is in an inactive state (e.g., not being accessed by user, not receiving communications, etc.). For example, in at least one embodiment, when the device is in an inactive state, power management controller 1120 performs one or more of the following: power down the unused portion of the display and/or any backlight associated therewith; allow one or more of processor(s) 1106 to go to a lower power state if less computing power is required in the closed configuration; and shutdown any devices and/or components (e.g., wireless module) that may be unused when an electronic device is in an inactive state.

Communication interface(s) 1118 may provide an interface for system 1100 to communicate over one or more networks and/or with any other suitable device. Communication interface(s) 1118 may include any suitable hardware and/or firmware. Communication interface(s) 1118, in at least one embodiment, may include, for example, a network adapter, a wireless network adapter, a telephone modem, and/or a wireless modem.

One or more display controllers 1114 generate screen data for displaying images on one or more respective display screens of display devices 1112.

System control logic 1108, in at least one embodiment, can include one or more I/O controllers to provide an interface to any suitable input/output device(s) such as, for example, an audio device (not shown) to help convert sound into corresponding digital signals and/or to help convert digital signals into corresponding sound, a camera or a camcorder.

At least one processor 1106 may be packaged together with logic for one or more controllers of system control logic 1108. For example, at least one processor 1106 may be packaged together with logic for one or more controllers of system control logic 1108 to form a System in Package (SiP). In another example, at least one processor 1106 may be integrated on the same die with logic for one or more controllers of system control logic 1108. In a further example, at least one processor 1106 may be integrated on the same die with logic for one or more controllers of system control logic 1108 to form a System on Chip (SoC).

For touch control, touch controller(s) 1102 may include touch sensor interface circuitry 1124 and touch control logic 1126. A touch controller and its corresponding touch input device 1116 is described herein with reference to a particular display device 1112. Depending on the embodiment, however, a different touch controller and corresponding touch input device 1116 may be configured for each display device 1112 if multiple display devices are implemented. Touch sensor interface circuitry 1124 may be coupled to one or more touch sensor(s) 1122 to detect touch input(s) over a touch surface layer a display device 1112. Touch sensor interface circuitry 1124 may include any suitable circuitry that may depend, for example, at least in part on the touch-sensitive technology used for the touch input device 1116, which may include one or more touch sensor(s) 1122. Touch sensor interface circuitry 1124, in one embodiment, may support any suitable multi-touch technology. Touch sensor interface circuitry 1124, in at least one embodiment, can include any suitable circuitry to convert analog signals corresponding to the touch surface layer into any suitable digital touch input data.

Touch control logic 1126 may be coupled to help control touch sensor interface circuitry 1124 in any suitable manner to detect touch input over a touch surface layer of a display device. Touch control logic 1126 for at least one embodiment may also be coupled to output, in any suitable manner, digital touch input data corresponding to touch input detected by touch sensor interface circuitry 1124. Touch control logic 1126 may be implemented using any suitable logic, including any suitable hardware, firmware, and/or software logic (e.g., non-transitory tangible media), that may depend, for example, at least in part on the circuitry used for touch sensor interface circuitry 1124. Touch control logic 1126 for at least one embodiment may support any suitable multi-touch technology.

Touch control logic 1126 may be coupled to output digital touch input data to system control logic 1108 and/or at least one processor 1106 for processing. At least one processor 1106 for at least one embodiment may execute any suitable software to process digital touch input data output from touch control logic 1126. Suitable software may include, for example, any suitable driver software and/or any suitable application software. As illustrated in FIG. 11, system memory 1110 may store software 1128, which is invoked and/or currently executing, and non-volatile memory and/or storage device 1130 may store software 1134.

For other sensor input controls, one or more sensor controllers 1140 may include sensor interface circuitry 1142 and sensor control logic (e.g., for motion sensor control, fingerprint sensor control, audio sensor control, button press control, other biometric sensors' control, etc.). Sensor interface circuitry 1142 may be coupled to a sensor input device 1150 (e.g., motion sensor, fingerprint sensor, microphone, button, facial feature sensor, hand feature sensor, pulse sensor, vein pattern sensor, eye (retina and/or iris) sensor, other biometric sensors, or any non-biometric sensor) to control the operation of the particular input device and receive the particular inputs (e.g., movement measurements, captured fingerprints, voice commands, button press signals, voice patterns, eye retinas and/or irises, facial features, hand features, palm prints, pulse features, vein patterns, etc.). Sensor interface circuitry 1142 may include any suitable circuitry that may depend, for example, at least in part on the particular technology (e.g., motion sensor technology, fingerprint sensor technology, microphone technology, button press technology, other biometric sensor technology, non-biometric sensor technology, etc.) used for the particular input device. For example, sensor interface circuitry 1142 for a fingerprint sensor may support multi-fingerprint capturing technology and may be provided in one or more display devices 1112 or another separate fingerprint capturing surface. In another example, sensor interface circuitry 1142 for a motion sensor may support both accelerometer measurements and gyroscope measurements. Depending on the particular sensor used, sensor interface circuitry 1142 may include suitable circuitry to convert analog signals to into any suitable digital data.

Sensor control logic 1144 may be coupled to control sensor interface circuitry 1142 in any suitable manner to control the particular sensor and to capture appropriate data. Sensor control logic 1144, for at least one embodiment, may also be coupled to output, in any suitable manner, digital data detected by sensor interface circuitry 1142. Sensor control logic 1144 may be implemented using any suitable logic, including any suitable hardware, firmware, and/or software logic (e.g., non-transitory tangible media), that may depend, for example, at least in part on the circuitry used for sensor interface circuitry 1142. Sensor control logic 1144, for at least one embodiment, may support any suitable motion detection technology, any suitable multi-fingerprint capturing technology, and any other biometric or non-biometric technology associated with the particular sensor being used.

Sensor control logic 1144 may be coupled to output digital data (e.g., movement data, fingerprint data, voice data, button press data, etc.) to system control logic 1108 and/or at least one processor 1106 for processing. At least one processor 1106 for at least one embodiment may execute any suitable software to process the digital data output from sensor control logic 1144. For example, digital data may, in one or more embodiments, be decrypted using a trusted symmetric key (e.g., 156) and then used to authenticate a user. Suitable software may include, for example, any suitable driver software and/or any suitable application software. As illustrated in FIG. 11, system memory 1110 may store suitable software 1128 and/or non-volatile memory and/or storage device(s) may store any suitable software 1134.

Embodiments of the mechanisms disclosed herein may be implemented in hardware, software, firmware, or a combination of such implementation approaches. Embodiments of this disclosure may be implemented, at least in part, as computer programs or program code executing on programmable systems comprising at least one processor, a storage system (including volatile and non-volatile memory and/or storage elements), at least one input device, and at least one output device.

Program code (e.g., 904, 1030, 1128), may be applied to input instructions to perform at least some of the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor, among other examples.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative machine-executable instructions (or computer-executable instructions) stored on a machine-readable storage medium (or a computer readable medium) which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable storage media containing instructions or containing design data, such as Hardware Description Language (HDL), which defines structures, circuits, apparatuses, processors and/or system features described herein. Such embodiments may also be referred to as program products.

Note that with the numerous examples provided herein, interaction may be described in terms of two, three, four, or more network elements, hosts, devices, computing systems, subsystems, modules, engines, and/or other components. However, this has been done for purposes of clarity and example only. It should be appreciated that the system can be divided (e.g., segmented, partitioned, separated, etc.) in any suitable manner. Along similar design alternatives, any of the illustrated modules, nodes, elements, hosts, devices, systems, and other components of FIGS. 1 through 11 may be consolidated or combined in various possible configurations, all of which are clearly within the broad scope of this specification. It should be appreciated that the embodiments illustrated in the FIGURES (and their teachings) are readily scalable and can accommodate a large number of components, as well as more complicated/sophisticated arrangements and configurations. Accordingly, the examples provided should not limit the scope or inhibit the broad teachings of the systems as potentially applied to a myriad of other architectures.

It is also important to note that the operations described with reference to the preceding FIGURES illustrate only some of the possible scenarios that may be executed by, or within, the systems and devices. Some of these operations may be deleted or removed where appropriate, or these operations may be modified or changed considerably without departing from the scope of the discussed concepts. In addition, the timing of these operations may be altered considerably and still achieve the results taught in this disclosure. As one example, the processes depicted in the accompanying figures do not necessarily require the particular order shown, or sequential order, to achieve the desired results. In certain implementations, multitasking and parallel processing may be advantageous. The preceding operational flows have been offered for purposes of example and discussion. Substantial flexibility is provided by the system in that any suitable arrangements, chronologies, configurations, and timing mechanisms may be provided without departing from the teachings of the discussed concepts.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments of the subject matter disclosed herein. Certain features that are described in this specification in the context of separate embodiments can also be implemented in combination in a single embodiment. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. The system, apparatus, method, and machine readable storage medium embodiments can include one or a combination of the following examples:

Example A1 provides an apparatus or a system comprising: a memory including computer-executable instructions stored therein; a processor coupled to the memory, the processor including a trusted execution environment (TEE); a sensor; a user interface coupled to the TEE, wherein the TEE is to: unlock the user interface, wherein the user interface includes a plurality of selectable settings associated with a plurality of access levels for sensor data captured by a sensor; receive a selection signal from the user interface indicating that a user selected a first setting associated with a first access level for the sensor data; and restrict access to the sensor data based on a first set of one or more entities associated with the first access level.

In Example A2, the subject matter of Example A1 can optionally include a housing, where the user interface includes a knob rotatably attached to the housing and communicably coupled to the TEE, where rotation of the knob from a second setting in one position to the first setting in another is to cause the selection signal to be sent to the TEE.

In Example A3, the subject matter of Example A1 can optionally include a touch screen display coupled to the TEE, where the user interface includes a privacy panel including a slider bar to be displayed on the touch screen display coupled to the TEE, where movement of the slider bar from a second setting in one area of the privacy panel to the first setting in another area of the privacy panel is to cause the selection signal to be sent to the TEE.

In Example A4, the subject matter of Example A3 can optionally include where the TEE is further to provide the privacy panel for display on the touch screen display, where the selection signal is to be sent to the TEE in response to touch input by the user.

In Example A5, the subject matter of any one of Examples A1-A4 can optionally include the apparatus further comprising a user interface controller to unlock the user interface based on authenticating the user.

In Example A6, the subject matter of Example A5 can optionally include where the user interface controller is further to: receive a request to unlock the user interface; provide for display, on a touch screen display, one or more prompts for user authentication input; receive the user authentication input; and authenticate the user based on determining that the user authentication input is valid.

In Example A7, the subject matter of any one of Examples A1-A6 can optionally include wherein the first set of one or more entities includes at least one of: a sensor subsystem of the sensor; a plurality of sensor subsystems of a plurality of sensors; device applications and the plurality of sensor subsystems; a connected device, the device applications, and the plurality of sensor subsystems; devices connected to a local area network, the connected device, the device applications, and the plurality of sensor subsystems; and authorized cloud applications, the devices connected to the local area network, the connected device, the device applications, and the plurality of sensor subsystems.

In Example A8, the subject matter of any one of Examples A1-A7 can optionally include where the TEE is further to: receive a second selection signal from the user interface indicating that the user selected a second setting associated with a second access level for the sensor data captured by the sensor; and restrict the access to the sensor data based on a second set of one or more entities associated with the second access level.

In Example A9, the subject matter of Example A8 can optionally include where, based on the second access level being less restrictive than the first access level, the second set of one or more entities includes the first set of one or more entities.

In Example A10, the subject matter of any one of Examples A1-A9 can optionally include where the TEE is further to restrict access to other sensor data from one or more other sensors based on the first set of one or more entities associated with the first access level.

In Example A11, the subject matter of any one of Examples A1-A10 can optionally include where the access to the sensor data is to be restricted by allowing the first set of one or more entities associated with the first access level to access the sensor data and preventing other entities from accessing the sensor data.

Example M1 provides method comprising: unlocking a user interface coupled to a trusted execution environment (TEE) of a processor in a device, wherein the user interface includes a plurality of selectable settings associated with a plurality of access levels for sensor data captured by a sensor; receiving a selection signal from the user interface indicating that a user selected a first setting associated with a first access level for the sensor data captured by the sensor; and restricting access to the sensor data based on a first set of one or more entities associated with the first access level.

In Example M2, the subject matter of Example M1 can optionally include where the user interface includes a knob rotatably attached to the housing and communicably coupled to the TEE, where rotation of the knob from a second setting in one position to the first setting in another is to cause the selection signal to be sent to the TEE.

In Example M3, the subject matter of Example M1 can optionally include where the user interface includes a privacy panel including a slider bar to be displayed on a touch screen display of the device, where movement of the slider bar from a second setting in one area of the privacy panel to the first setting in another area of the privacy panel is to cause the selection signal to be sent to the TEE.

In Example M4, the subject matter of Example M3 can optionally include providing the privacy panel for display on the touch screen display, where the selection signal is to be sent to the TEE in response to touch input by the user.

In Example M5, the subject matter of any one of Examples M1-M4 can optionally include unlocking the user interface based on authenticating the user.

In Example M6, the subject matter of Example M5 can optionally include providing for display, on a touch screen display, one or more prompts for user authentication input, receiving the user authentication input, and authenticating the user based on determining that the user authentication input is valid.

In Example M7, the subject matter of any one of Examples M1-M6 can optionally include wherein the first set of one or more entities includes at least one of: a sensor subsystem of the sensor; a plurality of sensor subsystems of a plurality of sensors; device applications and the plurality of sensor subsystems; a connected device, the device applications, and the plurality of sensor subsystems; devices connected to a local area network, the connected device, the device applications, and the plurality of sensor subsystems; and authorized cloud applications, the devices connected to the local area network, the connected device, the device applications, and the plurality of sensor subsystems.

In Example M8, the subject matter of any one of Examples M1-M7 can optionally include receiving a second selection signal from the user interface indicating that the user selected a second setting associated with a second access level for the sensor data captured by the sensor; and restricting the access to the sensor data based on a second set of one or more entities associated with the second access level.

In Example M9, the subject matter of Example M8 can optionally include where, based on the second access level being less restrictive than the first access level, the second set of one or more entities includes the first set of one or more entities.

In Example M10, the subject matter of any one of Examples M1-M9 can optionally include restricting access to other sensor data from one or more other sensors based on the first set of one or more entities associated with the first access level.

In Example M11, the subject matter of any one of Examples M1-M10 can optionally include where the restricting access to the sensor data includes: allowing the first set of one or more entities associated with the first access level to access the sensor data; and preventing other entities from accessing the sensor data.

An Example Y1 provides an apparatus, the apparatus comprising means for performing the method of any one of the Examples M1-M11.

In Example Y2, the subject matter of Example Y1 can optionally include that the means for performing the method comprises at least one processor and at least one memory element.

In Example Y3, the subject matter of Example Y2 can optionally where the at least one memory element comprises machine readable instructions that when executed, cause the apparatus to perform the method of any one of Examples M1-M11.

In Example Y4, the subject matter of any one of Examples Y1-Y3 can optionally include that the apparatus is one of a computing system or a system-on-a-chip.

An Example X1 provides at least one machine readable storage medium comprising instructions, where the instructions when executed realize an apparatus or implement a method as provided in any one of Examples A1-A11 or M1-M11.

What is claimed is:

1. An apparatus, comprising:
a processor including a trusted execution environment (TEE), wherein the TEE is to:
receive a selection signal from a user interface indicating that a user selected a first setting of a plurality of selectable settings included in the user interface, the plurality of selectable settings associated with a plurality of access levels for first sensor data captured by a first sensor, the plurality of access levels to correspond to respective combinations of entities to access the first sensor data, wherein the first setting is to be associated with a first access level corresponding to a first combination of entities to access the first sensor data captured by the first sensor; and
restrict access to the first sensor data to the first combination of entities specified by the first access level.

2. The apparatus of claim 1, wherein the first setting is to be selected by the user for a particular combination of sensors including the first sensor.

3. The apparatus of claim 2, wherein the sensors of the particular combination of sensors are to capture two or more types of sensor data.

4. The apparatus of claim 1, wherein the first combination of entities includes a first authorized entity external to the apparatus.

5. The apparatus of claim 4, wherein the first authorized entity is a cloud application.

6. The apparatus of claim 5, wherein the plurality of access levels includes a second access level specifying a second combination of entities for the first sensor data captured by the first sensor, the second combination of entities to exclude the first authorized entity external to the apparatus and include a second entity internal to the apparatus.

7. The apparatus of claim 6, wherein the first combination of entities is to include the second entity internal to the apparatus.

8. The apparatus of claim 7, wherein the second entity is a TEE-enabled application.

9. The apparatus of claim 1, wherein the user interface includes a touch screen; and wherein the selection signal is responsive to a touch input on the touch screen by the user.

10. The apparatus of claim 1, wherein the apparatus is a system-on-a-chip.

11. The apparatus of claim 1, wherein the TEE is further to:
receive a second selection signal from the user interface indicating that the user selected a second setting of the plurality of selectable settings, the second setting to be associated with a second access level corresponding to a second combination of entities to access second sensor data captured by a second sensor; and
restrict access to the second sensor data to the second combination of entities specified by the second access level.

12. The apparatus of claim 1, wherein the TEE is further to:
authenticate the user based on biometric input information of the user; and
unlock the user interface in response to the user being authenticated.

13. A method comprising:
receiving, in a trusted execution environment (TEE) of a processor, a selection signal from a user interface indicating that a user selected a first setting of a plurality of selectable settings included in the user interface, the plurality of selectable settings associated with a plurality of access levels for first sensor data captured by a first sensor, the plurality of access levels corresponding to respective combinations of entities for accessing the first sensor data, wherein the first setting is associated with a first access level corresponding to a first combination of entities for accessing the first sensor data captured by the first sensor; and
restricting access to the first sensor data to the first combination of entities specified by the first access level.

14. The method of claim 13, wherein the first setting is selected by the user for a particular combination of sensors including the first sensor.

15. The method of claim 13, further comprising:
receiving a second selection signal from the user interface indicating that the user selected a second setting of the plurality of selectable settings, the second setting associated with a second access level corresponding to a second combination of entities for accessing second sensor data captured by a second sensor; and
restricting access to the second sensor data to the second combination of entities specified by the second access level.

16. One or more machine readable media having instructions stored thereon, the instructions when executed by one or more processors cause the one or more processors to:
receive, in a trusted execution environment (TEE) of the one or more processors, a selection signal from a user interface indicating that a user selected a first setting of a plurality of selectable settings included in the user interface, the plurality of selectable settings associated with a plurality of access levels for first sensor data captured by a first sensor, the plurality of access levels to correspond to respective combinations of entities to access the first sensor data, wherein the first setting is to be associated with a first access level corresponding to a first combination of entities to access the first sensor data captured by the first sensor; and
restrict access to the first sensor data to the first combination of entities specified by the first access level.

17. The one or more machine readable media of claim 16, wherein the first setting is to be selected by the user for a particular combination of sensors including the first sensor.

18. The one or more machine readable media of claim 16, wherein the first combination of entities includes an authorized cloud application.

19. The one or more machine readable media of claim 16, wherein the instructions, when executed by the one or more processors, cause the one or more processors further to:
receive a second selection signal from the user interface indicating that the user selected a second setting of the plurality of selectable settings, the second setting to be associated with a second access level corresponding to a second combination of entities to access second sensor data captured by a second sensor; and
restrict access to the second sensor data to the second combination of entities specified by the second access level.

20. The one or more machine readable media of claim 16, wherein the instructions, when executed by the one or more processors, cause the one or more processors further to:
authenticate the user based on biometric input information of the user; and
unlock the user interface in response to the user being authenticated.

21. A system, comprising:
a processor including a trusted execution environment (TEE), wherein the TEE is to:
receive a first selection signal from a user interface indicating that a user selected a first setting of a plurality of selectable settings included in the user interface, the plurality of selectable settings associated with a plurality of access levels for first sensor data captured by a first sensor, the plurality of access levels to correspond to respective combinations of entities to access the first sensor data, wherein the first setting is to be associated with a first access level corresponding to a first combination of entities to access the first sensor data captured by the first sensor; and
restrict access to the first sensor data to the first combination of entities specified by the first access level.

22. The system of claim 21, wherein the first setting is to be selected by the user for a particular combination of sensors including the first sensor.

23. The system of claim 21, further comprising:
a touch screen, wherein the TEE is further to:
authenticate the user based on biometric input information of the user, wherein the user interface is to be provided for display on the touch screen in response to the user being authenticated, wherein the first selection signal is to be sent to the TEE in response to touch input by the user via the user interface displayed on the touch screen.

24. The system of claim 21, wherein the TEE is further to:
receive a second selection signal from the user interface indicating that the user selected a second setting of the plurality of selectable settings, the second setting to be associated with a second access level corresponding to a second combination of entities to access second sensor data captured by a second sensor; and
restrict access to the second sensor data to the second combination of entities specified by the second access level.

* * * * *